United States Patent
Butts et al.

(10) Patent No.: US 8,213,321 B2
(45) Date of Patent: Jul. 3, 2012

(54) CONTROLLER AREA NETWORK CONDITION MONITORING AND BUS HEALTH ON IN-VEHICLE COMMUNICATIONS NETWORKS

(75) Inventors: Nicholas Lloyd Butts, West Fargo, ND (US); Noel Wayne Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 491 days.

(21) Appl. No.: 12/021,337

(22) Filed: Jan. 29, 2008

(65) Prior Publication Data
US 2008/0186870 A1 Aug. 7, 2008

Related U.S. Application Data

(60) Provisional application No. 60/887,668, filed on Feb. 1, 2007.

(51) Int. Cl.
*G01R 31/08* (2006.01)
(52) U.S. Cl. ......... 370/251; 370/242; 370/249; 370/252
(58) Field of Classification Search .......... 370/242–249, 370/251, 252
See application file for complete search history.

(56) References Cited

U.S. PATENT DOCUMENTS

| | | | | |
|---|---|---|---|---|
| 6,425,009 | B1* | 7/2002 | Parrish et al. | 709/224 |
| 6,609,051 | B2 | 8/2003 | Fiechter et al. | |
| 7,039,577 | B1* | 5/2006 | Fingerhut et al. | 703/21 |
| 2004/0042396 | A1* | 3/2004 | Brown et al. | 370/227 |
| 2004/0138852 | A1* | 7/2004 | Everts et al. | 702/179 |
| 2006/0195728 | A1* | 8/2006 | Lin et al. | 714/42 |
| 2007/0033512 | A1* | 2/2007 | Johnson | 714/801 |
| 2007/0133423 | A1* | 6/2007 | Okumura | 370/248 |
| 2007/0260911 | A1 | 11/2007 | Marilly et al. | |

FOREIGN PATENT DOCUMENTS

| | | |
|---|---|---|
| DE | 10235525 | 4/2003 |
| DE | 10307365 | 9/2004 |
| DE | 102005027378 | 11/2006 |
| DE | 102005025265 | 1/2007 |
| DE | 102005031724 | 1/2007 |
| DE | 102005044236 | 3/2007 |
| WO | 2006021702 | 3/2006 |

OTHER PUBLICATIONS

BOSCH CAN Specification. Version 2. Robert Bosch GmbH, Postfach 30 02 40, D-70442 Stuttgart: Sep. 1991.
Schneider, Larry X. A New Method for Detecting and Locating Insulation Defects in Complex Wiring Systems. The AMMTIAC Quarterly, vol. 1, No. 2. <URL: http://ammtiac.alionscience.com/quarterly>.

* cited by examiner

*Primary Examiner* — Donald Mills
*Assistant Examiner* — Samina Choudhry
(74) *Attorney, Agent, or Firm* — Yee & Associates, P.C.; Jeremy J. Westlake

(57) ABSTRACT

A method and system monitor a communications network, e.g., a controller area network (CAN), and more specifically, an in-vehicle communications network, by maintaining a count of each type of error code and a histogram of all network messages seen by each of the controllers during a measurement period; and by determining a bus health index of the communication bus based upon a percentage of a given type of error to the total count of all errors during a measurement period. An individual controller or controller area network bus segment can be indicated as having a communications problem as a result of the health index.

10 Claims, 17 Drawing Sheets

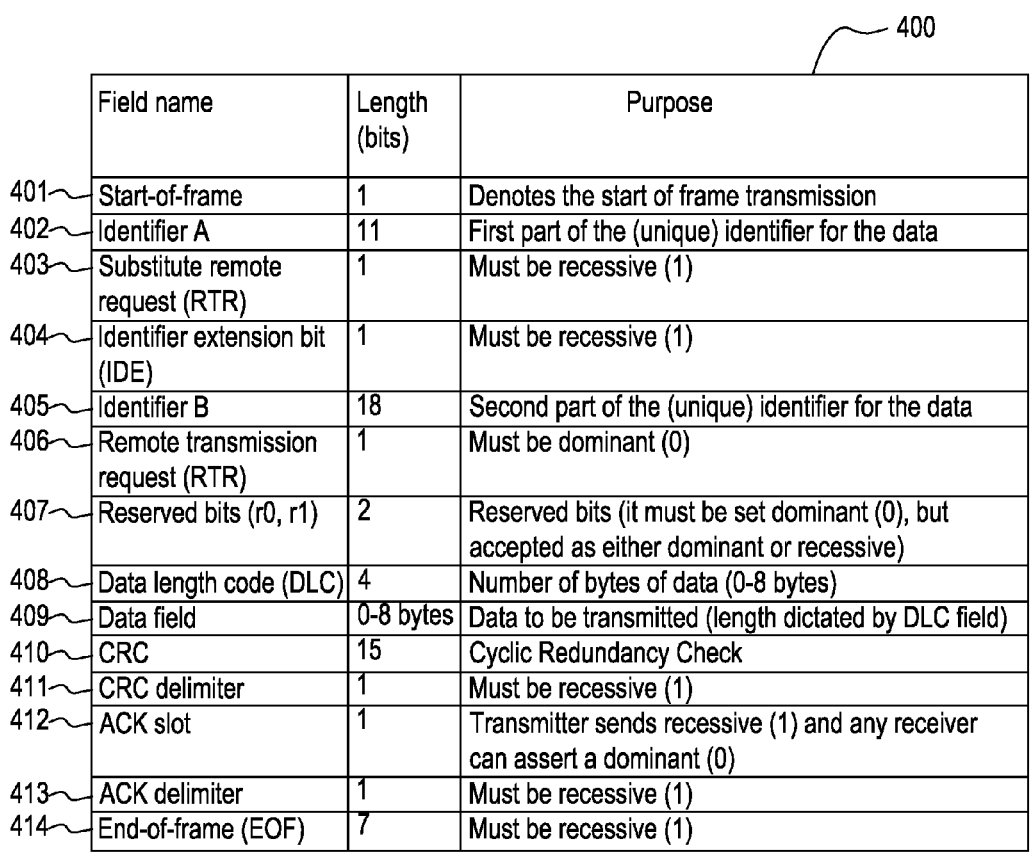

| Field name | Length (bits) | Purpose |
|---|---|---|
| 401 Start-of-frame | 1 | Denotes the start of frame transmission |
| 402 Identifier A | 11 | First part of the (unique) identifier for the data |
| 403 Substitute remote request (RTR) | 1 | Must be recessive (1) |
| 404 Identifier extension bit (IDE) | 1 | Must be recessive (1) |
| 405 Identifier B | 18 | Second part of the (unique) identifier for the data |
| 406 Remote transmission request (RTR) | 1 | Must be dominant (0) |
| 407 Reserved bits (r0, r1) | 2 | Reserved bits (it must be set dominant (0), but accepted as either dominant or recessive) |
| 408 Data length code (DLC) | 4 | Number of bytes of data (0-8 bytes) |
| 409 Data field | 0-8 bytes | Data to be transmitted (length dictated by DLC field) |
| 410 CRC | 15 | Cyclic Redundancy Check |
| 411 CRC delimiter | 1 | Must be recessive (1) |
| 412 ACK slot | 1 | Transmitter sends recessive (1) and any receiver can assert a dominant (0) |
| 413 ACK delimiter | 1 | Must be recessive (1) |
| 414 End-of-frame (EOF) | 7 | Must be recessive (1) |

Fig. 4

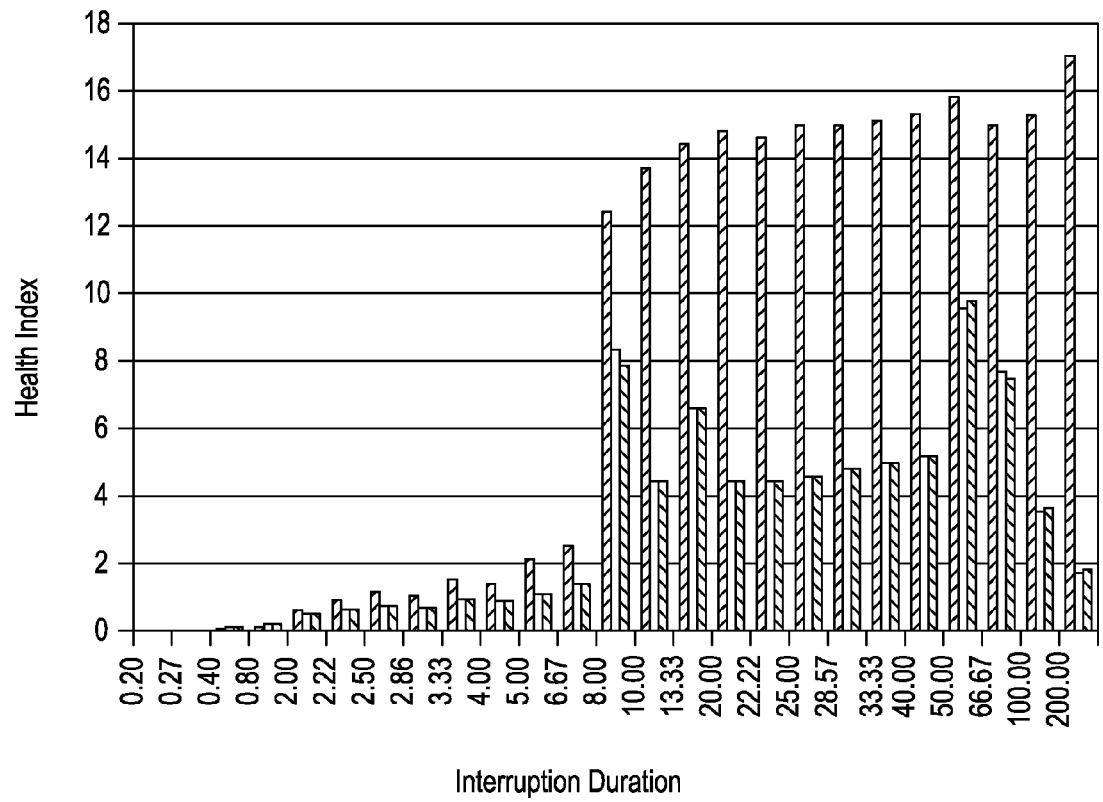
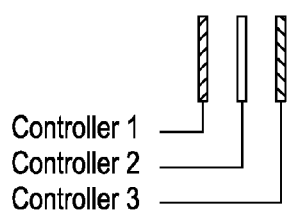
Fig. 14

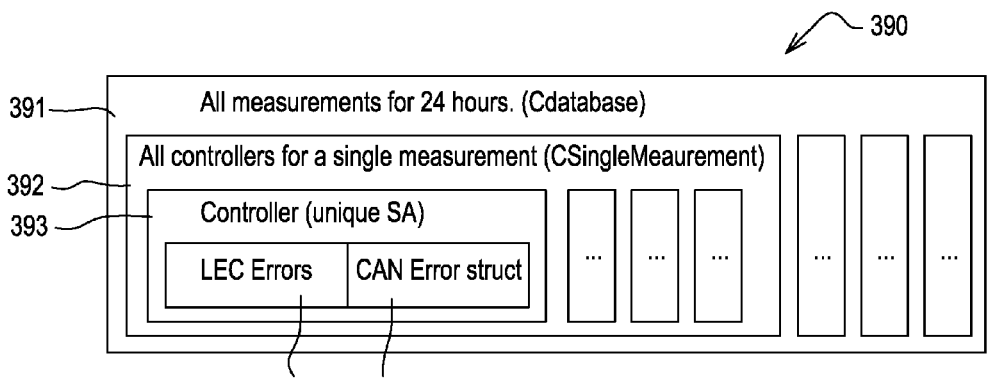
Fig. 19
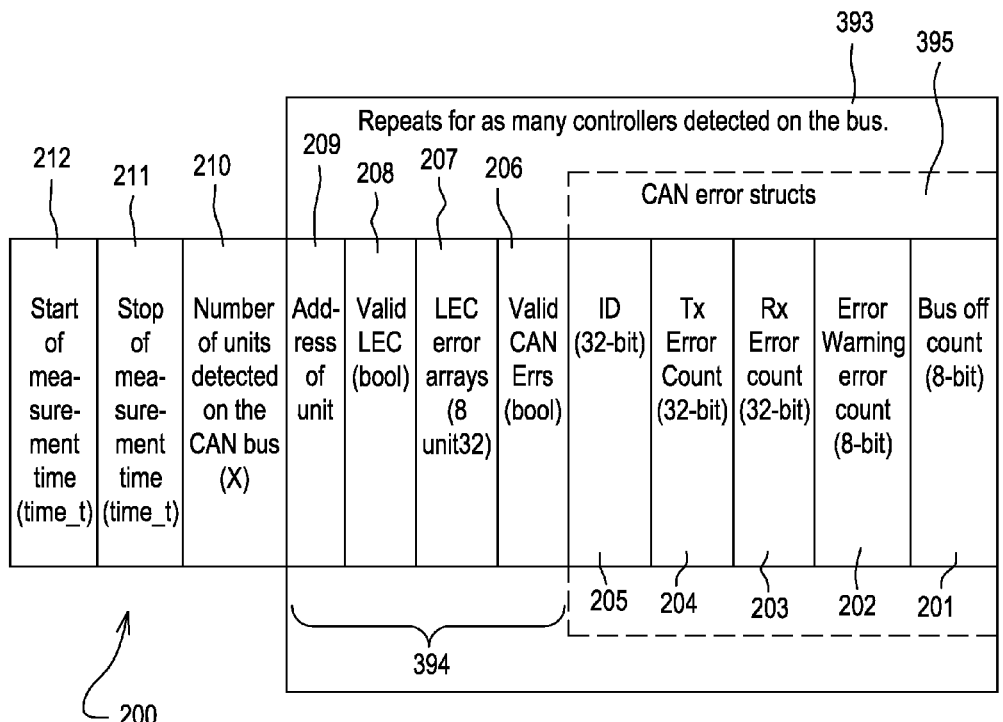
Fig. 20
Fig. 21

CONTROLLER AREA NETWORK CONDITION MONITORING AND BUS HEALTH ON IN-VEHICLE COMMUNICATIONS NETWORKS

This document (including all drawings) claims priority based on U.S. provisional application Ser. No. 60/887,668, filed Feb. 1, 2007, and entitled CONTROLLER AREA NETWORK CONDITION MONITORING AND BUS HEALTH ON IN-VEHICLE COMMUNICATIONS NETWORKS under 35 U.S.C. 119(e).

FIELD OF THE INVENTION

The present invention relates to onboard electronics used in vehicles.

BACKGROUND OF THE INVENTION

Problems facing the use of onboard electronics in vehicles include the lack of diagnostic ability by service personnel and No Fault. Found (NFF) warranty costs. When a controller is returned to the manufacturer, it must be assumed to be defective until proven otherwise. Service and Warranty departments need time to put a returned controller on a manufacturing tester and perform other diagnostic tasks to determine either the root cause of the problem or to determine whether it is a NFF controller, i.e., to determine that no problem could be found. Some controllers that are returned as NFF may indeed have a physical problem, but the problem may not manifest itself unless it is embedded in a vehicle and is being subjected to vibrations, temperature extremes, or other operating conditions.

SUMMARY OF THE INVENTION

A system and method of an embodiment of the invention utilizes advanced diagnostics to minimize No Fault Found determinations by diagnosing Electronic Control Units (ECUs) problems in the fields and by predicting the failure of a component before the component fails. A controller area network (e.g., CAN) condition monitor system defines and identifies how a controller area network bus fails over time, detects these problems at run time, and reports this information back to an end user and/or service personnel.

A system and method of an embodiment of the invention monitors an in-vehicle communications network having a plurality of controllers coupled together over the network. An error diagnostic originates from one of the plurality of controllers over the network. The error diagnostic comprises a diagnostic signal and a lost signal over the network. The error diagnostic is received over the network at one or more other remaining ones of the plurality of controllers. The remaining controllers statistically analyze the error diagnostic and determine an origin of the error diagnostic.

A system and method for monitoring a network of controllers maintains a count of each type of error codes and a histogram of all controller area network messages seen by each of the controllers during a measurement period. The data is read, analyzed and presented by at least one controller that is within or separate from the network being analyzed. The data is presented as a network area controller bus health index based upon a percentage of a given error to the total count of all errors. The health index may additionally be based on pre-defined weights given to the percentage of each of the given type of errors to the total count of errors and the number of messages lost during the measurement period. Failures can be predicted for a component before the component fails by determining a change in the health index over time. Web pages are generated with the status and results of the monitoring. Links in the web page are enabled to show graphs of CAN errors, CAN bus loading, and error counts. A controller having communications problems can be detected and isolated by determining that the isolated individual controller having the communications problem has an elevated health indicator when compared to other controllers on the CAN bus. A controller can further be determined to fail at some future point in time based on the trends in the health index over time.

BRIEF DESCRIPTION OF THE DRAWINGS

FIG. 4 shows the composition of an extended CAN data frame.
FIG. 14 is an illustrative example of the health index for controllers 1, 2, and 3.
FIG. 19 illustrates a representation of a database.
FIG. 20 illustrates a representation of a database record for a single measurement.
FIG. 21 illustrates a condition monitoring status.

DESCRIPTION OF THE INVENTION

Figure 1:
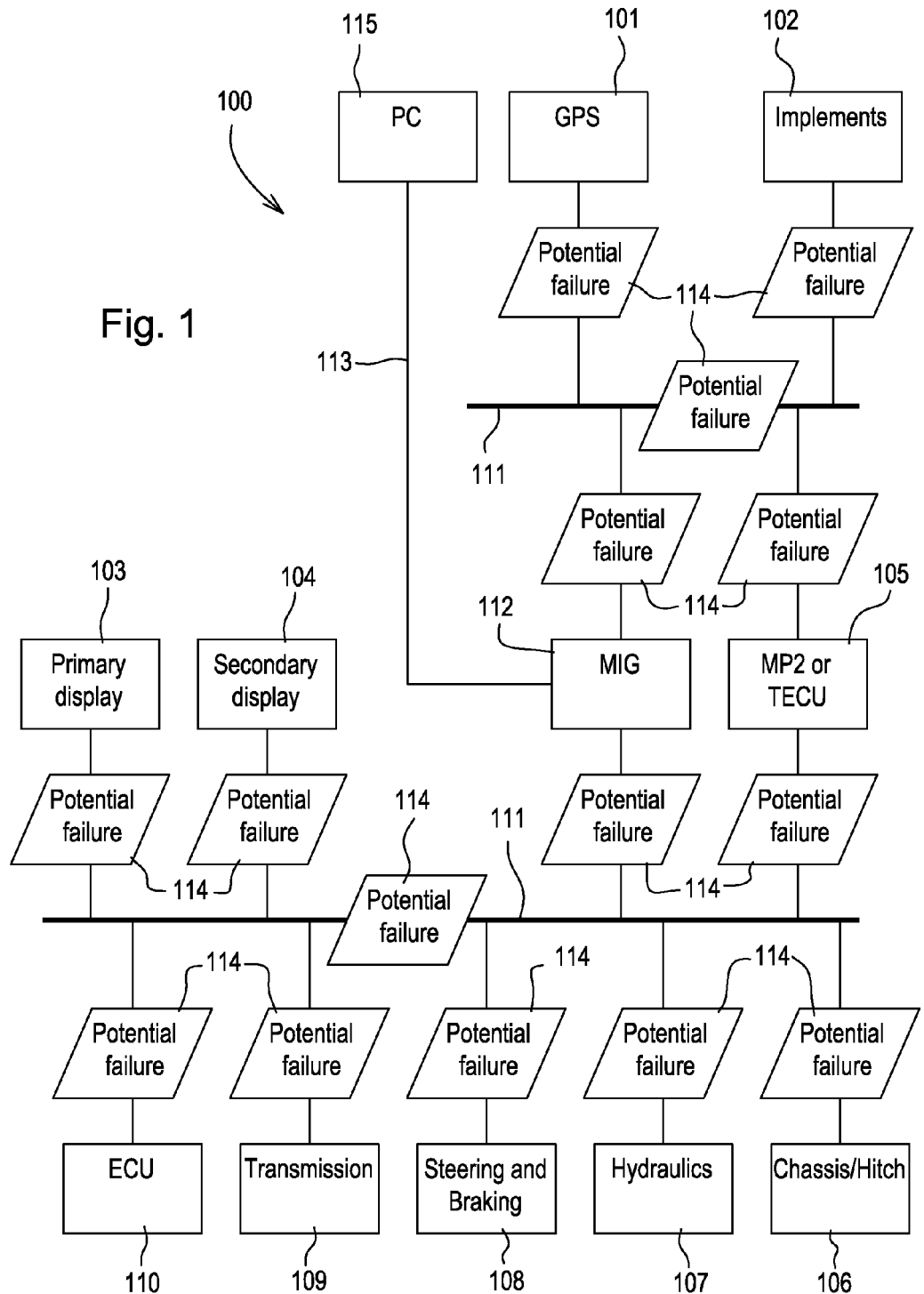
FIG. 1 shows an overview of a vehicle network.

Definitions
API—Application Programming Interface
Bus—Generic term for a CAN communication bus
CAN—Controller Area Network
CCMON—CAN Condition Monitoring
Controller—generic term for an Electronic Control Unit
CPU—Central Processing Unit
DM—Diagnostic Message
DMx—A specific diagnostic message
ECU—Electronic Control Unit
FLASH—Electrically writable non-volatile memory FTP—File Transfer Protocol
GE—Group Extension
GS2—Green Star Display 2, a high end VT display
GUI—Graphical User Interface
Health—The ability of the CAN bus to convey data. Increased errors rates, therefore, decrease the health of the CAN bus
HTTP—Hyper Text Transfer Protocol
ISO—International Organization for Standardization
ISO11783—a standard similar to J1939 developed by ISO
J1939—A communications standard developed by SAE
MA—Memory Access
Machine Information Gateway—a high end embedded Linux based controller.
NFF—No Fault Founds
PC—Personal Computer
PCB—Printed Circuit Board
PDU—Protocol Data Unit
PF—PDU Format
PGN—Parameter Group Name
PPC—PowerPC, a 32-bit RISC based processor
PR—J1939 Priority
PS—PDU Specific
PTO—Power Take Off
RAM—Random Access Memory
RPM—Revolutions Per Minute
SA—J1399 Source Address
SAE—Society of Automotive Engineers
SMTP—Simple Mail Transfer Protocol
ST10F269—a 16-bit control orientated microcontroller made by ST Microelectronics
TCP—Transmission Control Protocol
TP—Transport Protocol
UDP—User Datagram Protocol
VT—Virtual Terminal, an ISO11783 part 6 device that can be used as display by any controller on the CAN bus that supports the VT protocol.
VTi—Virtual Terminal for Implements, a lower end version of the GS2 display.
XML—Extensible Markup Language In a preferred embodiment of the invention, pre-existing controllers on the CAN bus are utilized to provide some amount of diagnostic information. This information is typically in the form of error flags and error counts. The standard John Deere Operating System (JDOS v4.05) keeps a count of the number of times a CAN controller goes error active and bus-off. Traditionally, this information has not been communicated to other controllers to perform advanced diagnostics. To further enhance the diagnostic capability of each controller, programming code is provided that maintains a count of the error codes and a histogram of all CAN messages seen by each of the controllers on the CAN bus. This information is then sent to a central controller (e.g., the Machine Information Gateway or MiG) for analysis.

Software on each controller records errors and keeps a histogram of all CAN messages. These counts are synchronized across all of the controllers via a start and stop message. To synchronize the counts, Parameter Group Name (PGN) 65124 (ISO 11992 General Purpose Message #2/5) is used. Byte 1 (1 offset) in this message indicates if the counters should be started or stopped. A non-zero value indicates the counters should be started. A zero value indicates the counters should be stopped. This sets up a measurement interval by synchronizing all controllers on the bus within some margin of error. The current software implementation assumes the start and stop messages will always be transmitted and received successfully.

The measurement interval synchronization may be off by a few CAN messages. The variance will be in the CAN bus length and message propagation delay, the interrupt or CAN polling latency, the processing time it takes to receive the CAN message and determine it is a message to synchronize the counts, and the time it takes to clear the counts.

Once a measurement period has been concluded, the data is read from the controllers via J1939 Memory Access protocol. The software that reads this data can be a PC based tool or software on an embedded controller. It is analyzed and the results are presented to an interested person as a CAN bus health index.

The CAN Monitoring program health index calculation is based on user defined weights, the percentage of errors, and the number of messages lost during a measurement period. The program produces useable indicators of CAN bus health.

When errors are received that are greater than a CAN frame's bit, the health index starts to increase. With interruption durations in the 2-8 us (micro-second) range, a user or dealer can be informed that a potential problem is forming. At greater than 10 us, problems may be encountered that would cause loss of function on a vehicle. With the detection of a lost message the health index increases rapidly. Missing messages may most likely cause a loss of vehicle function.

The end result of the analysis is an executive summary. The CCMON generates several web pages that list the status and results of the analysis. The general idea behind the summary is a stop light approach. If the "CAN Bus Health" is green then everything is working correctly, yellow indicates an elevated error occurrence on the CAN bus, but the vehicle is still operating normally, and a red status indicates the CAN bus is potentially affecting the operation of the vehicle. A user can also click on the links to see graphs of CAN errors, Tx/Rx counts, CAN bus loading, and graphs of the CAN bus loading.

Based on this data, it is possible to detect and isolate a controller that is having communications problems. It is also possible to isolate what part of the CAN network is having intermittent communications. The CCMON program isolates the problem to an individual controller by determining that the isolated individual controller having the communications problem has an elevated health indicator when compared to other controllers on the CAN bus, thereby indicating to the user what controller should be replaced and/or repaired. In the case of a failing CAN harness, the program should be able to indicate to the user where oh the CAN bus the problem is occurring. With this data, it is possible to perform preventive maintenance and thereby keep the vehicle operating at maximum productivity. Based on trends in the data, it is possible to determine if a controller is going to fail. Currently this is performed by an end-user setting the desired weights for the various errors. These weights can be further refined by running the program on actual vehicles over time and recording the results. The results can be post-processed and adjusted for optimal results on a particular vehicle.

Advantages of a preferred embodiment include i) the use of existing controllers on the CAN bus with no incremental cost for additional controllers; ii) minimal impact on the performance of the controllers through the use of minimal programming code for maintaining diagnostic counts; iii) the ability to retrofit existing vehicles in the field by reprogramming the controllers with updated application software; and iv) the capability to isolate a problem to either a field replaceable electronics unit or between two points on the CAN bus where the problem is occurring.

A preferred embodiment of the invention provides a system and method for performing advanced diagnostics on a communication bus, for example, a controller area network (CAN) bus.

In an exemplary controller area network environment such as a vehicle having controllers for sensors and devices, all documented messages can be simulated and transmitted on the CAN bus. Intermittent CAN faults can occur in such an embodiment. For example, when a vehicle is traveling in rough terrain and experiencing intense vibrations, the connector on an ECU may intermittently interrupt the CAN bus. Likewise, a pinch in the CAN harness may rub against the body of the vehicle during the vibrations. These CAN interruptions will introduce corrupt CAN frames on the bus. When a controller detects these corrupt CAN frames it will assert the CAN error frame. If the vehicle slows down or stops, these problems may go away. Therefore, this problem may go undetected during a service repair unless the vehicle is driven again in rough terrain.

FIG. 1 shows an example of a vehicle network 100. In this example, there are several ECU's including a GPS ECU 101, implement ECUs 102, primary display ECU 103, secondary display ECU 104, an MP2 or TEC ECU 105, chassis/hitch ECU 106, hydraulics ECU 107, steering and braking ECU 108, transmission ECU 109, and other ECUs for other sensors or devices 110. Each controller has a small amount of programming code to count CAN errors and count the number of messages Tx/Rx (histogram). These ECU's are connected via a CAN bus 111. The CAN bus allows the ECU's to exchange data with each other. Typically each ECU transmits data that it collects and/or analyzes on the network. This can include engine speed, engine torque, wheel speed, current transmission gear, requested transmission gear, hour meter, etc. In this example the MIG 112 is also present. The MIG 112 allows very complex, computationally intense applications to be embedded within a vehicle. In some embodiments, the MIG is a dedicated computer having a processor and storage and/or memory wherein the storage and/or memory have embedded therein an operating system, program code, instructions, and data. The MIG can generate requests to start and stop measurements on individual controllers. Once a measurement period has concluded (for example, a five minute period), the master reads the data from the controllers and analyzes it. A dedicated Ethernet interface 113 allows the MIG to communicate with a Personal Computer (PC) 115, having a processor, and storage and/or memory, to display additional information. FIG. 1 also shows potential failure points 114 on the CAN bus.

The following discusses i) the problem of advanced CAN diagnostics, ii) how CAN exists within a framework of an OSI model, iii) how a CAN bus operates, v) what comprises a CAN frame, v) what errors are typically detectable on individual controllers, vi) how to measure errors on the CAN bus, and vii) ways to measure CAN bus health. The following also introduces the concept of "health". "Health" is defined herein as the ability of a controller area network bus to operate effectively and efficiently without the loss of data or an increase in CAN error frames. Therefore, a decrease in CAN health is defined as a decrease in the ability to convoy data or the loss of data and an increase in CAN error frames.

CAN and OSI Model

The Open System Interconnect (OSI) model is a layered, abstract description for communication protocols. It is used to describe the functionality of these protocols at different levels. The layers are, from top to bottom, the application layer, presentation layer, session layer, transport layer, network layer, data link layer, and the physical layer. The application layer provides information to the user. Examples of protocols at the application level are Hyper-Text Transport Protocol (HTTP), File Transfer Protocol (FTP), Simple Mail Transfer Protocol (SMTP), and Telnet. The presentation layer provides a data interface to the application layer. This layer may compress/decompress or encrypt/decrypt data. The session layer handles individual sessions between the host and the client. The transport layer handles transporting the data between two computers. Examples include Transmission Control Protocol (TCP), User Datagram Program (UDP), and the transport protocol defined in ISO 11783. The network layer handles routing of the data between two computers. The Data Layer handles the physical transfer of the data. Examples include Ethernet and the CAN data frames. The physical layer defines the hardware that is used to transfer data. For CAN, the physical layer is typically a twisted pair wire using differential signaling.

The BOSCH CAN specification version 2.0 only defines CAN with respect to the Physical and Data Link Layer. The other layers are left to a user (product manufacturer) to implement as desired. In a preferred embodiment, the J1939 and ISO 11783 protocols are used on top of the CAN bus. These protocols define the Network and Application layer. The remaining layers are somewhat defined throughout the protocol specifications.

The Physical layer is defined in broad terms. A few types of physical layers that can be used are a 2-wire differential twisted pair, 4-wire differential twisted pair, or a fiber optical channel. In a preferred embodiment, a 2-wire twisted pair is utilized. The BOSCH spec thoroughly defines the Data Link Layer. CAN uses a Carrier Sense Multiple Access/Bitwise Arbitration (CSMA-B) scheme for collision control. This is done with the concept of recessive and dominant bits. This is done using an open collector implementation. When controllers transmit on the bus, they listen to the resulting bit stream. If they attempt to transmit a recessive bit but see a dominant bit on the bus, they back off and retry the transmission when the current message has finished transmitting. Therefore, each CAN message can be encoded with a priority. The first controller to transmit a dominant bit wins control of the CAN bus.

CAN Physical Layer

Figure 2:
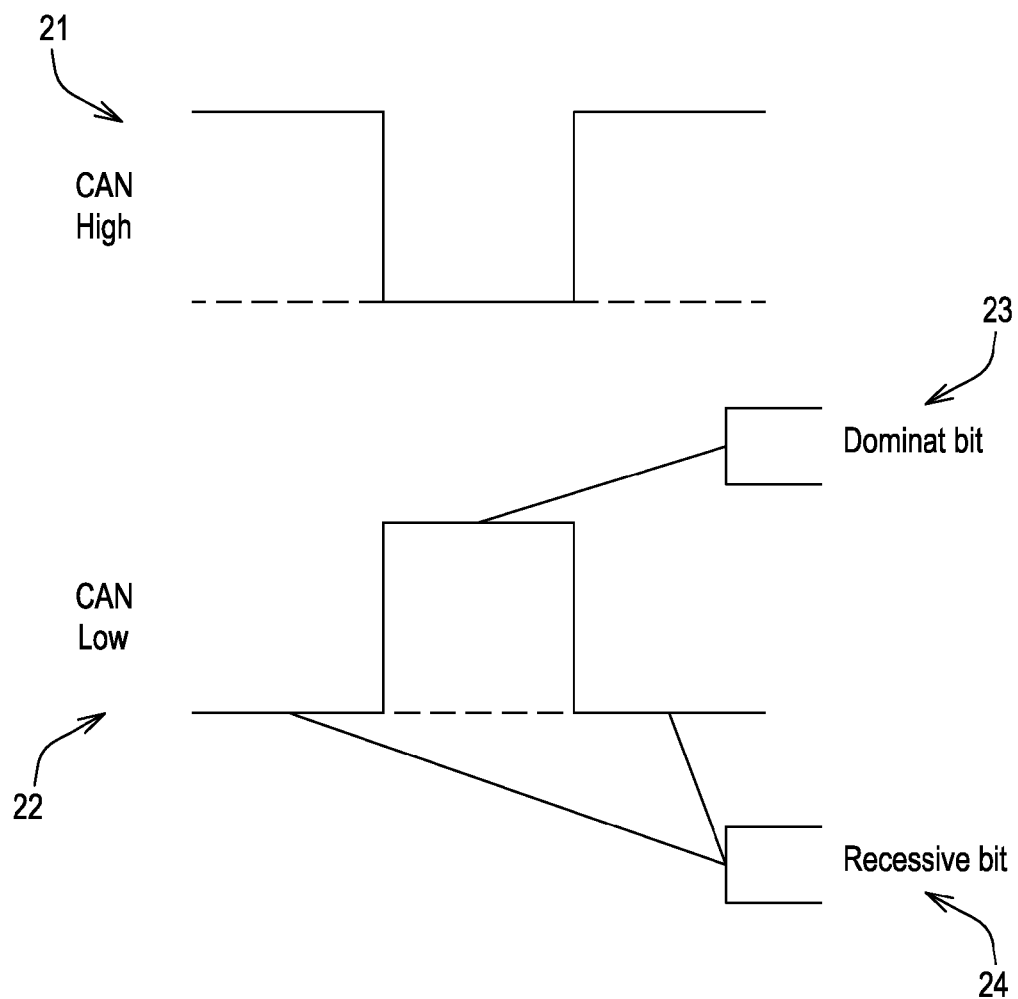
FIG. 2 shows the CAN physical layer.

FIG. 2 shows the CAN physical layer. In one embodiment, the CAN Physical layer is a standard twisted pair wire. In some embodiments, the twisted pair is shielded. To maintain signal integrity, the twisted pair carries a differential signal. The CAN High signal 21 typically varies between 2.4 volts when idle to 3 volts when active, while the CAN Low signal 22 typically varies between 2.4 volts when idle and 2 volts when active. This rejects common mode noise because both signals will be affected by the noise. A CAN frame is transmitted in an arbitration free method. This is done with the concept of dominant 23 and recessive 24 bits. A dominant bit 23 is a logic 0, while a recessive bit 24 is a logic 1. If multiple controllers attempt to communicate on a CAN bus simultaneously the last controller to transmit a dominant bit will win control of the bus.

CAN Frame

The CAN communication bus has been designed to be a ruggedized robust communication bus. This bus is often used to communicate information between ECU's on a vehicle. These ECUs can include engine controllers, transmission controllers, hitch controllers, header controllers, displays, data loggers, and hydraulic control systems.

Figure 3:
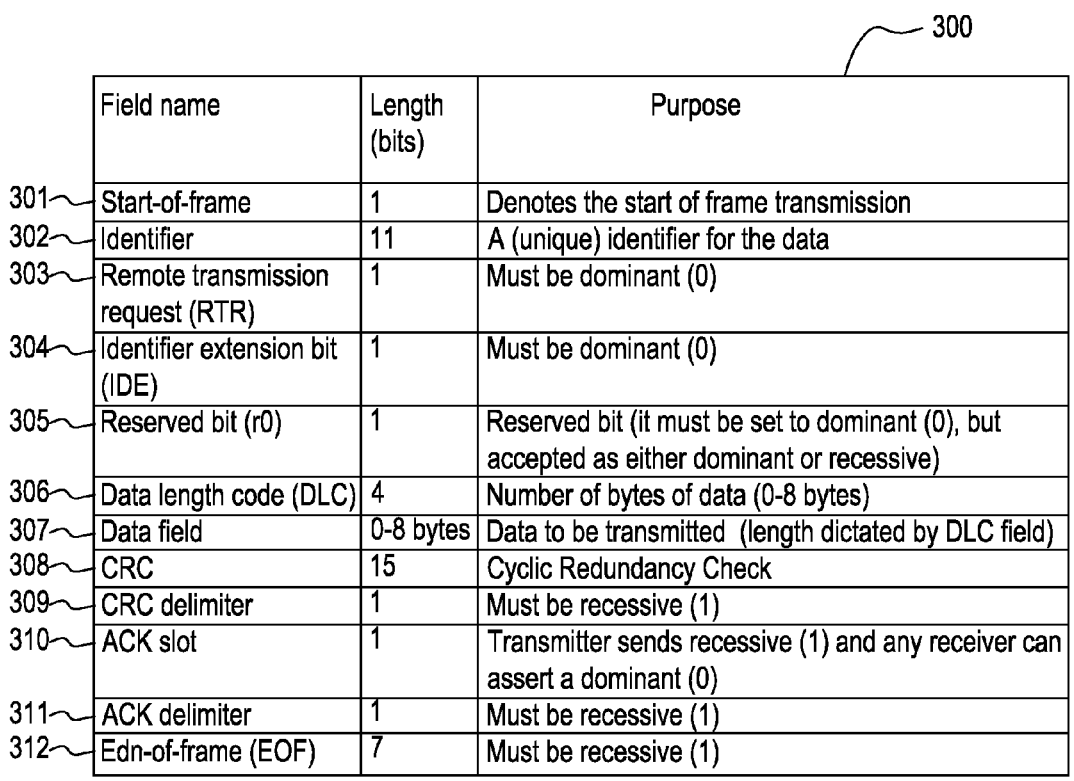
FIG. 3 shows the composition of a standard CAN data frame.

FIG. 3 shows the composition of a standard CAN data frame; and FIG. 4 shows the composition of an extended CAN data frame. The CAN Bus's data link layer is composed of the following fields: a Start of Frame bit (SOF) 301, 401, 11-bit or 29-bit identifier 302, 402, a data length count (DLC) 306, 408, 0 to 64 bits of data 307, 409, a 15-bit CRC 308, 410, CRC delimiter 309, 411, a 2-bit Acknowledge (ACK) field, 310, 311, 412, 413, and a 7-bit end of frame marker 312, 414.

Figure 5:
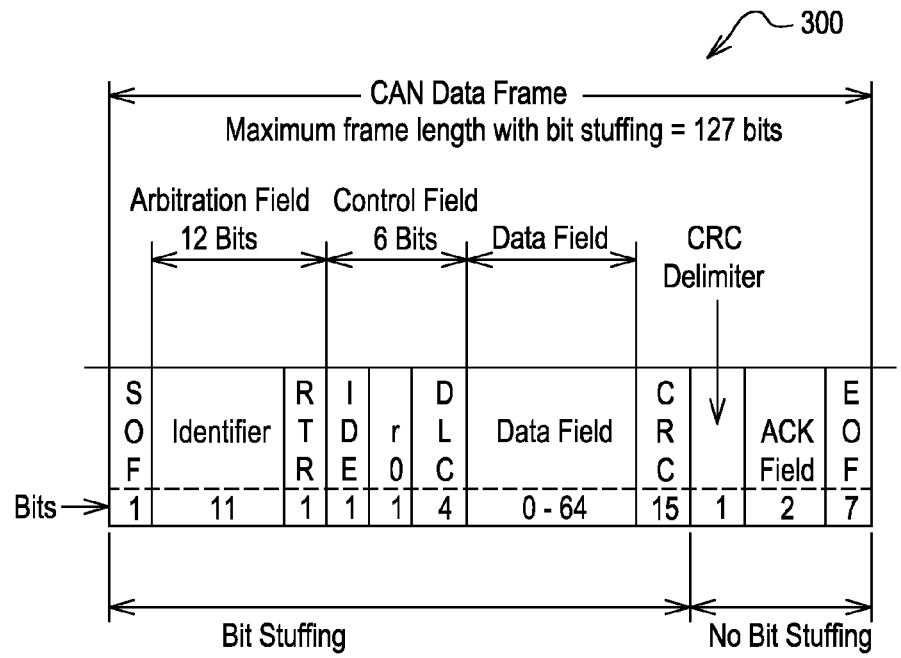
FIG. 5 shows the standard CAN data frame with bit stuffing.
Figure 6:
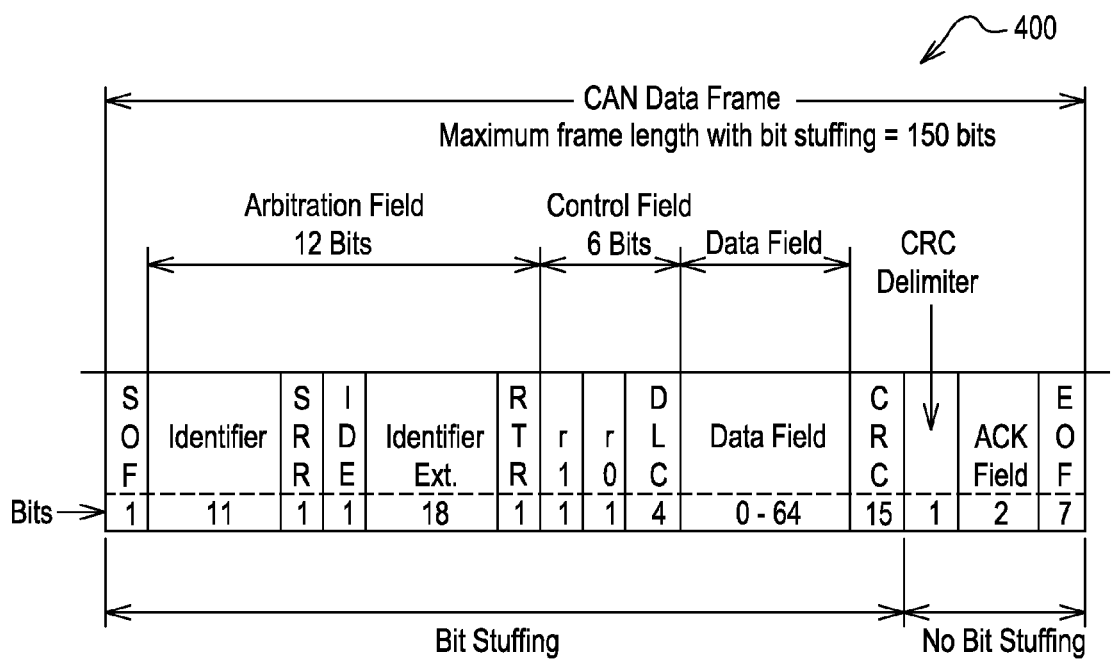
FIG. 6 shows the extended CAN data frame with bit stuffing.

FIGS. 5 and 6 show the composition of the standard and extended CAN data frames with bit stuffing 330, 440, respectively. The BOSCH standard specifies that only five consecutive bits of the same logic level are allowed. Therefore the standard specifies the need for bit-stuffing. The standard forces a sixth bit of the opposite polarity to break up runs of consecutive bits. For example, if 9 logic 0 bits must be transmitted, then after bit 5 a sixth logic 1 bit is inserted. Then the remaining 4 logic 0 bits are transmitted. This allows the CAN controllers on the bus to resynchronize their internal clocks.

CAN Errors

There are several potential error sources in a CAN message. The receiving CAN controller will generate one or more flags in response to detected errors. These flags are stuff errors, form errors, ACK errors, bit 1 errors, bit 0 errors, CRC errors, error warning status, and bus off status. Some CAN controllers may provide additional information such as the transmit and receive error counts.

The following summarizes the definitions of various types of errors that are detectable on a CAN controller.

Stuff—A stuff error is when the CAN controller detects six or more consecutive bits of the same state. Normally, the transmitting CAN controller will insert a stuff bit of the opposite state to allow other CAN controllers on the bus to resync their internal clocks.

Form—A form error occurs when a fixed format part of a CAN frame was received with an incorrect state. For example, the EOF field has a fixed format. If they are not received correctly, a form error will be generated.

ACK—An ACK Error occurs when no other controllers on the bus acknowledge the transmitted CAN message. Typically if at least one controller receives a transmitted CAN message, then it will assert the acknowledge bit.

Bit 1—A bit 1 error occurs when a transmitting unit wanted to transmit a recessive bit (a logic 1) but the monitoring value on the CAN bus was a dominant (a logic 0) bit.

Bit 0—A bit 0 error occurs when a transmitting unit wanted to transmit a dominant bit (a logic 0) but the monitoring value on the CAN bus was a recessive bit (a logic 1).

CRC—A CRC error occurs when the calculated CRC of the data that was received and the CRC within the frame do not match. This is typically caused by a corrupt bit in the frame.

Error Warning—The error warning status indicates the CAN controller has gone from the Error Active state to the Error Passive State. The BOSCH CAN Specification Version 2.0 defines three different states a CAN controller can be in. The first is Error Active. In this state the CAN controller will transmit and receive CAN frames normally. Each CAN Controller maintains transmit and receive error counts. If either the transmit or receive counts are incremented above 127, the unit goes into Error Passive. In this state the CAN Controller can only assert the passive error frame (see BOSCH spec for details). If the transmit count goes above 255, the unit goes bus-off. In the bus-off state, the CAN controller can no longer transmit CAN frames. Most CAN controllers require some sort of reset logic to get a controller out of the bus-off state. The controllers in this preferred embodiment will always attempt to reset the CAN controllers and get the unit back into error passive state. It is estimated that, in some embodiments, resetting the controller will take at the most 100 ms.

Bus Off—The bus off status indicates the CAN controller has shut itself off from transmitting or receiving data. Once this happens the node will no longer communicate. Typically, software monitors this condition and resets the CAN controller to recover from this failure.

By monitoring the controller area network bus for these error types, potential bus problems can be localized and potential failures predicted thereby reducing vehicle down time.

CAN Bus Speed

In a preferred embodiment, the CAN bus used is based on the SAE J1939/ISO 11783 standards. These standards define a bus speed of 250 Kbps. This allows controllers from different manufactures to be connected to the same CAN bus. This speed results in a CAN bit width of 4 μs.

Potential Measurement Methods

Several methods to measure the health of a CAN bus are further explained. The Time Domain Reflectometer (TDR) method determines impedance mismatches. This method would allow periodic checks of the integrity of the bus. However, a TDR is an expensive device and would add cost to a vehicle. A TDR does not catch intermittent errors, only impedance mismatches. The CAN Bit Timing Measurement device is able to measure short duration interruptions in the CAN bus. However, this device would be a separate controller on the CAN bus with special hardware. It would require increased processing power to handle the large amounts of data this device would collect. As such, this may be a potentially expensive device that would add cost to the vehicle. Digital Averaging is a method that can accurately determine very short intermittent faults in a wire. This is also an expensive method. It would only be able to perform the checks while the bus is not being used. The CAN Condition Monitor (CCMon) is a device that would be able to detect problems in the CAN bus prior to degrading vehicle operation capability. It is fairly inexpensive. The data can be collected in a distributed manor or sent to a central device for collection. This may have a lower cost approach than the other methods. However, this method may not be able to detect sub-bit errors accurately. It may also still require a device with a moderate amount of processing capability to synchronize the data collection and analyze the data.

A TDR is a device that uses signal integrity principles to measure the mismatch in impedance on a communication bus or Printed Circuit Board (PCB) trace. The idea is to generate a fast signal transition (impulse). This impulse will have a rise time that is sufficient to treat the communication bus or PCB trace as a transmission line. The impulse travels the length of the transmission line and reflects at the end or at any impedance mismatches. The reflection(s) then travels back to the source of the pulse were it is measured. The reflection strength is based on the reflection coefficient ρ. This is calculated by the following equation:

$$\rho = (Zt-Zo)/(Zt+Zo)$$

Zt is the impedance of the termination (end of the transmission line) and Zo is the impedance of the transmission medium. Any discontinuity in the transmission line will show up as an impedance mismatch. This mismatch can be substituted for Zt in the equation above and will result in some small reflection. These reflections will add and subtract to the standing wave voltage at the source and can be measured. Once the wave has traveled the length of the transmission line, one can look at the resulting measured voltages and see a representation of the transmission line.

The concept was to measure a baseline health of a CAN bus when the vehicle rolls off the production line. A TDR would be used to measure this baseline, which would be stored in non-volatile memory on some controller or the TDR controller itself. Periodically the TDR would measure the CAN bus when the CAN bus was idle, for example some time between 1:00 AM and 4:00 AM and after some amount of idle time on the CAN bus. This new measurement would be compared against the baseline measurement. If the new measurement differs from the baseline measurement by some configurable threshold, the user could be notified to have the service personal do more extensive diagnostics.

Unfortunately, the rise time of the pulse and the sample rate required to perform the TDR functionality would have to be very high. A 10 ns pulse may have a 4 meter blind spot, but would be able to measure a line of up to 500 meters in length. A typical CAN bus on a vehicle is most likely going to be less than 10 meters in length. Therefore, a 4 meter blind spot is not acceptable. To reduce the blind spot, the pulse duration (increase frequency) would need to be decreased. An Analog to Digital (A/D) converter capable of sampling in the hundreds of megahertz range and a microcontroller or digital signal processor (DSP) capable of handling the bandwidth of data could be used to sample the pulse and reflections. These factors make this approach prohibitively expensive to embed in every vehicle. This method may be able to isolate where on the CAN bus a problem is occurring, but to convert the length on the CAN bus to a Field Replaceable Unit (FRU) may be difficult.

A second approach or embodiment is to put a device on the CAN bus that monitors both CAN bus bit timing at a much faster rate than a normal CAN controller. This device can look for any signal changes outside the normal bit timing parameters. If it sees a very fast bit, it could signal the end user that abnormally fast bits were seen on the CAN bus. This may indicate a failing CAN bus. The downside to this approach is it would require a new device on the CAN bus. Also, the required sampling rate of the CAN bus would generate vast amounts of data that would have to be collected and analyzed. Therefore the cost of this approach may be cost prohibitive. This method would not be able to isolate the problem to a FRU.

A third approach or embodiment could use a system of digital and analog averaging. This method uses analog signals and processing to look for very fast intermittent failures on a communications bus.

A fourth approach or embodiment is to use the existing controllers on the CAN bus. Each CAN controller usually provides some amount of diagnostic information. This information is typically in the form of error flags and error counts. The standard John Deere Operating System (JDOS v4.05) keeps a count of the number of times a CAN controller goes error active and bus-off. Traditionally, this information has not been communicated to other controllers to perform advanced diagnostics. In this embodiment, to further enhance the diagnostic capability of each controller, additional code is added to maintain a count of the error codes and a histogram of all CAN messages seen by each of the controllers on the CAN bus. This information would then be sent to a central controller for analysis.

This approach has several benefits over the TDR approach in that i) it uses the existing controllers on the CAN bus with no incremental cost; ii) the additional code required to maintain the diagnostic counts is very small and has minimal impact on the performance of the controllers; iii) this method can be retrofitted on existing vehicles in the field by reprogramming the controllers with updated application software; iv) this method can isolate the problem to either a FRU or between two points on the CAN bus where the problem is occurring.

The description above has discussed the CAN bus from the BOSCH Specification and the CAN frame up to the J1939/ISO 11783 protocol. It discussed what some of the problems are with regard to advanced CAN diagnostics and how errors are reported on a CAN bus. Finally it discussed methods to measure the CAN bus health.

Bus Corruption

This following discusses sources of corruption on a CAN bus, how signal corruption on the CAN bus can be simulated, how the software was instrumented and what results were obtained.

Sources of Corruption

With any digital signal, there are several problems that can occur. Normally the signal can transition between logic 0 and logic 1. But the signal could become shorted to ground or shorted to VCC or go open circuit. This would prevent the signal from conveying information. These states are relatively easy to detect. When data is transmitted on a CAN bus, any resulting errors are flagged and are readable within software.

If the signal is shorted to ground, then it will always be in a dominant state. This is not a valid state for a CAN bus to be in. Therefore, it would be an indicator that the CAN bus is shorted to ground.

If a CAN bus is shorted to VCC, then when a controller transmits a dominant bit, it will see a recessive one. This is also not valid. A dominant bit should always override a recessive bit.

If a CAN bus becomes open-circuited, then the transmitting controller will never see other controllers' Acknowledge CAN frames that it transmits.

Therefore, the above three error conditions are relatively easy to detect and diagnose. The problem is, however, that if any of these three conditions occur, it will most likely reduce the functionality of the vehicle and potentially make the vehicle in-operable. Also a fourth error condition could exist, that being intermittent short's to ground, battery, or open circuits.

As an example, assume that based on a product's warranty data, only two root causes of CAN corruption are known. The first is interference between a CAN choke and the potting for the product. This can cause the CAN choke to have an intermittent connection with the CAN bus. The second problem is a poor connection between a connector on a PCB and the mating connector's pin receptacles. These pin receptacles would not make adequate contact with the connector on the PCB. This can cause intermittent connectivity problems with the PCB and the harness.

These problems will manifest themselves as the various types of errors on the CAN bus as discussed above. These errors can be measured and analyzed.

Simulation of Corruption

Figure 7:
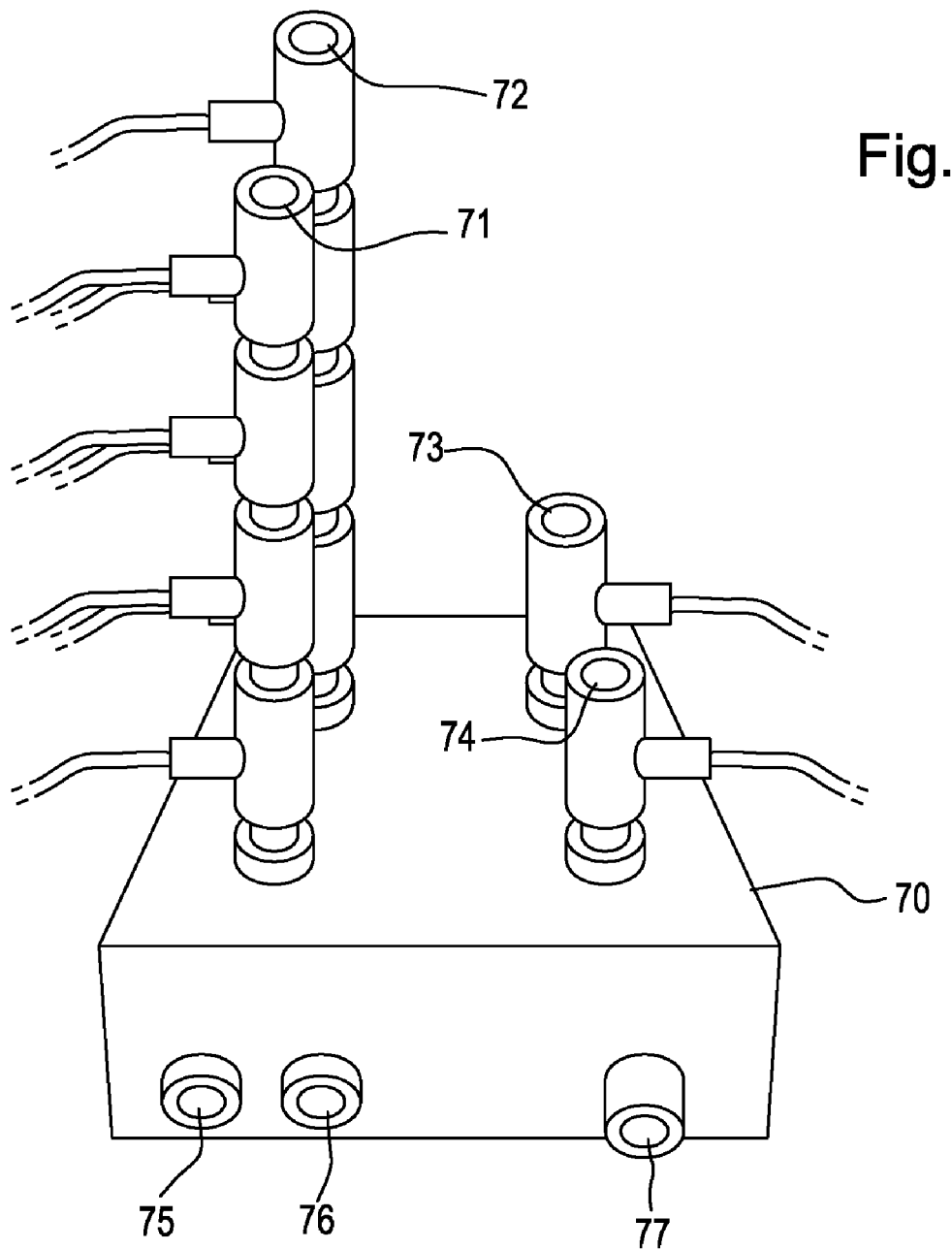
FIG. 7 shows an illustration of a bus corruptor device.

To simulate the CAN bus corruption, a device can be utilized that allows the CAN bus to be interrupted, simulating an intermittent open circuit failure. The duration and frequency of the interruption can be controlled by an input to this device. The bus corruptor uses high frequency video switches to connect the two sides of the CAN bus together or open the connection. FIG. 7 shows an illustration of a bus corruptor device 70. The banana plugs 71, 72 on the left are the CAN high and low lines for Controllers 2 and 3 of FIG. 8. The banana plugs 73, 74 on the right are the CAN high and low lines for controller 1. The red 75 and black 76 banana jacks on the side of the bus corruptor are +12 volts power and ground.

The bayonet Neill-Concelman (BNC) connector 77 is the connection point for the frequency generator.

Figure 8:
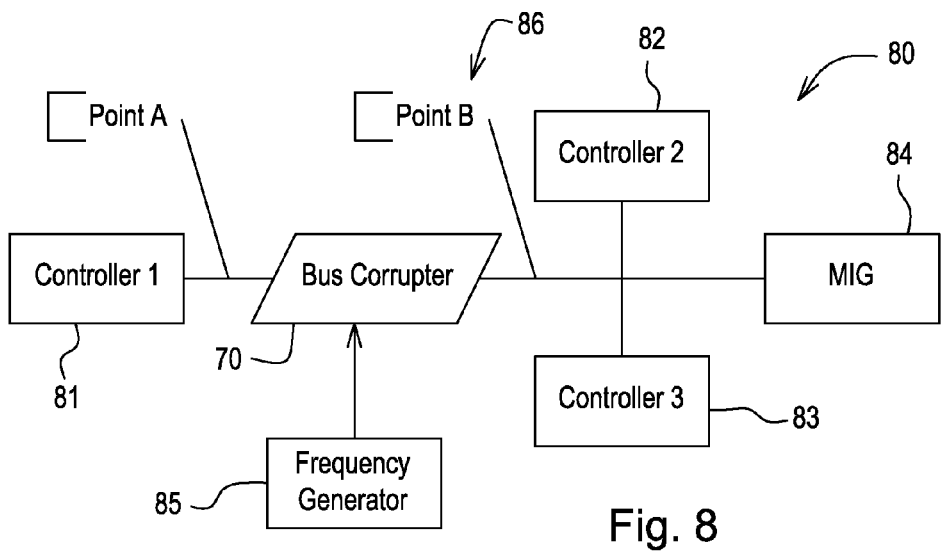
FIG. 8 is a block diagram of a bus corrupter test set up.

The bus corruptor 70 can be precisely controlled, and it is repeatable to support data collection and analysis. A test set up, as shown in FIG. 8, included three CAN based controllers 81, 82, 83. These controllers are connected together via a CAN bus 86. The CAN bus interrupter 70 is placed between controller 1 and controllers 2 and 3 on the CAN bus. A frequency generator 85 is fed into the CAN bus interrupter 70.

To verify operation of the CAN corruptor 70, several oscilloscope screen captures can be taken. When the CAN corruptor 70 is conducting, both CAN_H and CAN_L at a point B of the CAN corruptor can be seen. The CAN bits are viewable. The signal level is approximately 2.2V pk-pk and shows no appreciable signal level degradation. Other oscilloscope screen captures can show the signal level at a point A of the CAN corruptor with the corruptor non-conducting. This will show the "bus-lost arbitration" signal that occurs when no terminator is connected. During transitions of the control signal to the CAN corruptor, the oscilloscope will illustrate the signal levels including CAN_L at a point B at the transition from connected to disconnected where CAN_L is interrupting a CAN frame. There will be no indication of the CAN signal when the CAN corruptor turns off. Likewise, the oscilloscope will show CAN_H at a point B during the transition from connected to disconnected. Again, the signal is effectively eliminated when the CAN corruptor is non-conducting. It appears that this transition occurred when the CAN bus was in the recessive state. Oscilloscope screens can capture the bus being dominant when the CAN corruptor switches to non-conducting. When CAN_H interrupts a dominant bit, the bus switches to the non-conducting state quickly. Oscilloscope screens can capture a dominant bit on the CAN_L line when the CAN_L interrupts a dominant bit. The CAN corruptor conducts with no appreciable change to the signal levels and, when it is in the non-conducting state, it affectively blocks the signal. It also switches at a fast speed to support pulses down to 1 µs.

Software Instrumentation

Software code is incorporated into each controller to record errors and keep a histogram of all CAN messages. These counts are synchronized across all of the controllers via a start and stop message. To synchronize the counts, Parameter Group Name (PGN) 65124 (ISO 11992 General Purpose Message #2/5) is used. Byte 1 (1 offset) in this message indicates if the counters should be started or stopped. A non-zero value indicates the counters should be started. A zero value indicates the counters should be stopped. This sets up a measurement interval by synchronizing all controllers on the bus within some margin or error. The software implementation assumes the start and stop messages will always be transmitted and received successfully.

The measurement interval synchronization may be off by a few CAN messages. The variance will be in the CAN bus length and message propagation delay, the interrupt or CAN polling latency, the processing time it takes to receive the CAN message and determine it is a message to synchronize the counts, and the time it takes to clear the counts. For the test CAN bus described above and shown in FIG. 8, there was at most 2 counts difference between the controllers. Although in this test example, the CAN bus system was running 3 identical controllers with identical software. Therefore, in a real system, the counts may differ by a larger margin.

Once a measurement period has been concluded, the data is read from the controllers via J1939 Memory Access protocol. The software that reads this data can be a PC based tool or software on an embedded controller. The software to analyze the measurements will be discussed in a later section below.

Simulation Results

A number of tests were run on the instrumented software running on the three controllers. The bus corruptor was used to simulate periodic interruptions of the CAN bus, and a frequency generator was used to generate the interruptions. Initially the simulation was started with very short interruption durations of 0.2 µs. This was chosen since it is much smaller in duration then the 4 µs width of a CAN bit at 250 Kbps.

Figure 9:
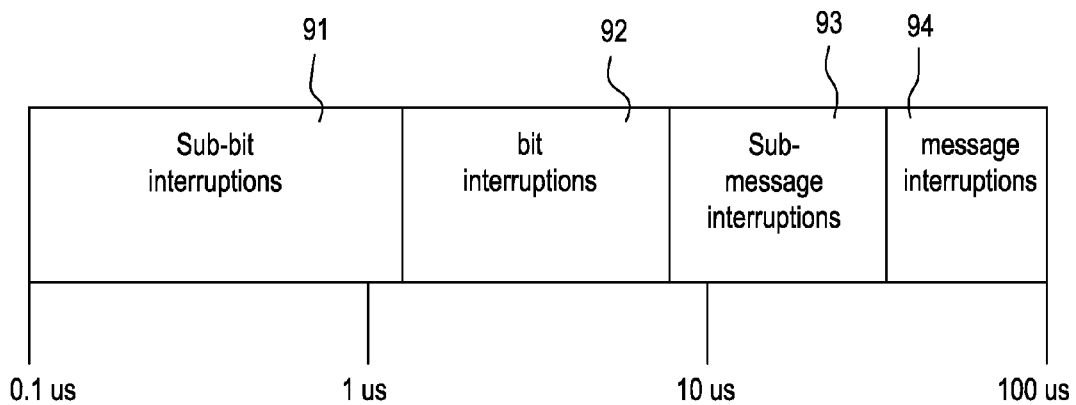
FIG. 9 shows a graphical example of the interruption types.

As shown in FIG. 9, the CAN interruptions were broken up into four categories: sub-bit 91, bit 92, sub-message 93, and message interruptions 94. FIG. 9 shows a graphical example of the interruption types. In the test example, the frequency of the interruptions was set to 83 Hz. This was chosen so the interruption frequency seemed random and the period wasn't a multiple of a typical CAN transmit rate of 10 Hz or 100 Hz. It was also assumed that when the CAN bus is interrupted, it isn't a single interruption. The interruption will probably occur several times in a row. This modeling of intermittent faults is similar to a switch opening and closing. Switches typically do not have a clean open or close response. When a switch is closed the signal may bounce between two logical states for tens of microseconds. Therefore, 5 interruptions were generated in a row. The width of the interruptions was increased and the effect on the CAN bus was measured.

The interruption frequency (duration of the interruption), the duty cycle (the percent of the period to interrupt the CAN bus), burst rate (number of back to back interruptions), burst frequency (period at the rate the interruptions occur), all of the error counts in percent (this is a percentage of each type of error based on the samples taken), and the health index as calculated by the CAN Condition Monitor program (discussed further below) are detailed.

Figure 11:
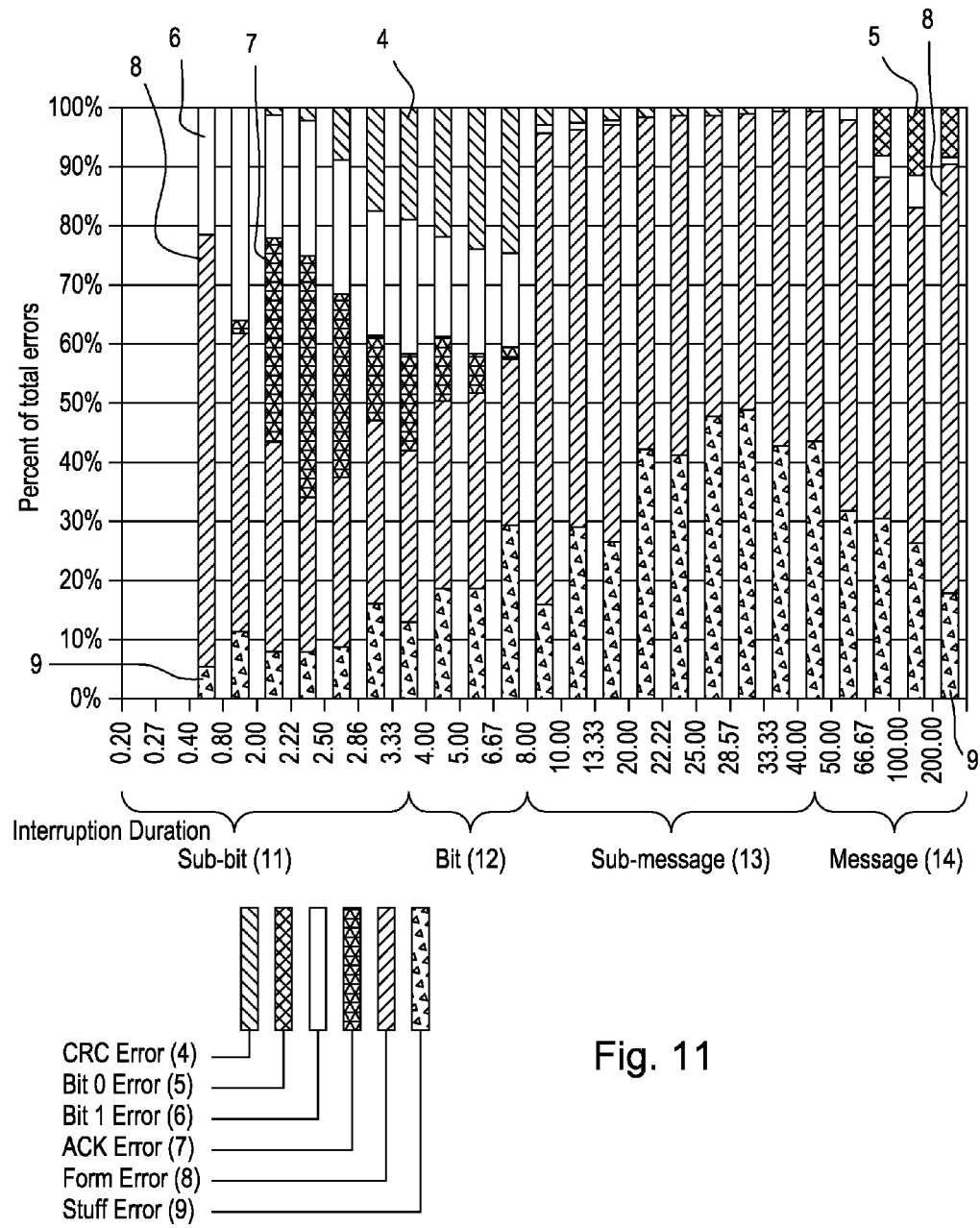
FIG. 11 shows the normalized percentage of the different types of errors for different interruption durations for controller 1 in the example test.
Figure 12:
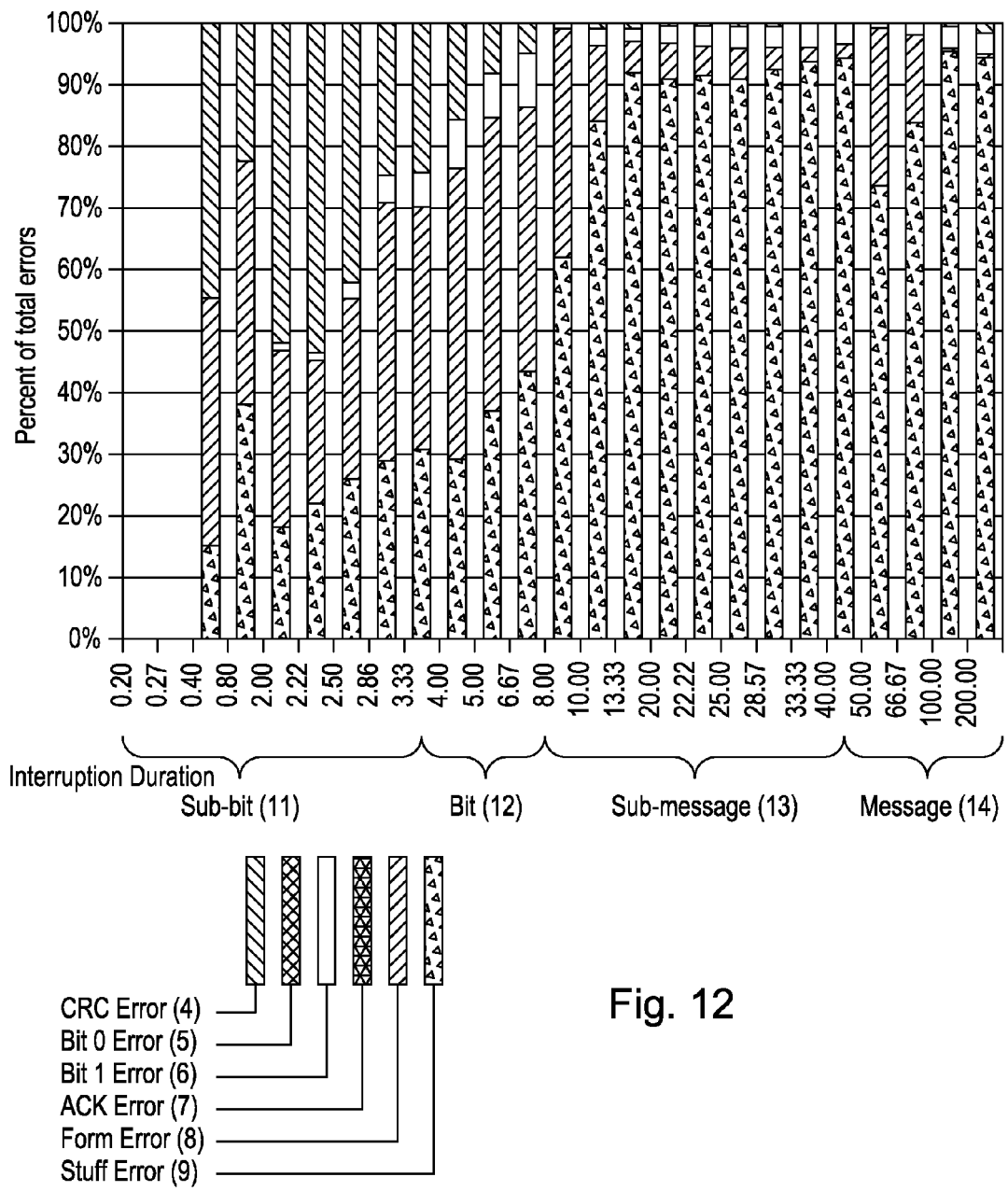
FIG. 12 shows the normalized percentage of the different types of errors for different interruption durations for controller 2 in the example test.
Figure 13:
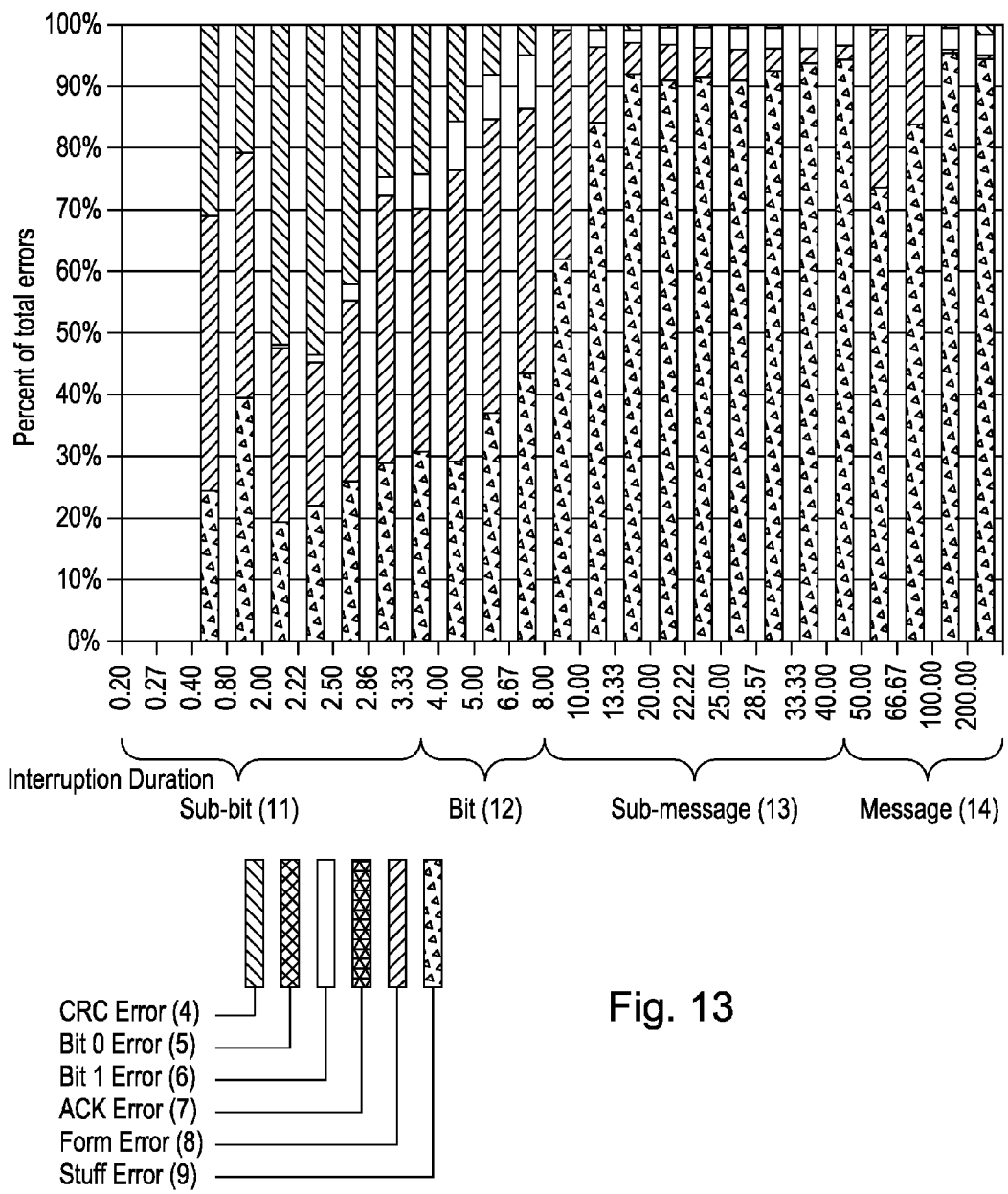
FIG. 13 shows the normalized percentage of the different types of errors for different interruption durations for controller 3 in the example test.

FIGS. 11, 12, and 13 summarize the various types of CAN errors over a range of interruptions for controllers 1, 2, and 3. Controller 1 is the controller that is separated on the CAN bus from Controller 2 and Controller 3. Therefore, it should see the highest number of corrupt messages. FIG. 11 shows the normalized percentage of the different types of errors versus interruption duration for controller 1. The different types of errors include CRC error 4, Bit 0 error 5, Bit 1 error 6, ACK error 7, Form error 8, and Stuff error 9. At the sub-bit interruption duration 11, form errors 8 and bit 1 errors 6 dominate. The form errors 8 are caused by the interruptions during a fixed format part of a CAN message. The fixed format sections of a CAN message are the SOF, SRR, IDE, RTR, r1, r2, CRC delimiter, and EOF. Therefore, if any of these fields encounters a corrupt bit, the message will be rejected. Since the fixed format bits are spread throughout a CAN frame, it is understandable that form errors are the most prevalent. For sub-bit errors, the interruption must occur during the bit sampling time. The form errors 8 will occur when controller 1 is receiving messages from controller 2 and 3. The bit 1 errors 6 will occur when controller 1 transmits a CAN frame. Bit 1 errors 6 are caused for the same reason as form errors 8, but are an indication that the controller can't transmit a frame.

Acknowledge errors 7 become significant as the interruptions move into the bit error range 12. These errors will be caused by the CAN bus becoming interrupted as controller 1 finishes transmitting a message but before it detects a bit 1 or 0 error. This will occur when controller 1 does not receive an acknowledgement after it transmits a message.

CRC errors 4 also become significant in the bit error range 12. These are caused by receiving bits that become corrupt as the message is received. A CRC error 4 will only be generated if the bit that was corrupted is not a fixed bit. This only occurs when controller 1 receives messages from controller 2 and 3.

At the sub-message error range 13, form errors 8 suddenly occupy the majority of the errors on the bus. An eight microsecond interruption is enough time to corrupt 2 bits of data. This drastically increases the probability of a form error 8. Stuff errors 9 also start to become significant. As the interruptions become longer, it will affect the bit-stuffing algorithm of the CAN controllers. The BOSCH CAN specification indicates that only five bits of the same polarity can be transmitted in a row. After five bits of the same polarity a sixth bit will be inserted into the bit stream of the opposite polarity. If the CAN bus corruptor interrupts the CAN bus during a stream of recessive bits, a receiving CAN controller can see this as a stuff error. When the CAN bus corruptor interrupts the bus, it causes the bus to go to the recessive state. Therefore, a receiving controller may see more than five recessive bits.

FIGS. 12 and 13 show the distribution of the different types of errors for controllers 2 and 3. FIGS. 12 and 13 appear similar since Controllers 2 and 3 see the same error rate on the CAN bus. When the errors start to occur there is a roughly equal distribution of CRC 4, Form 8, and Stuff 9 errors. CRC 4 errors increase slightly then decrease as the interruption duration increases. This occurs as the stuff errors 9 increase. At interruption durations greater than 8 µs, the stuff errors 9 dominate the distribution of errors.

Based on this data, it is feasible to detect and isolate an individual controller that is having communications issues on the CAN bus. A good indicator of sub-bit and bit failures is to look at the Bit 1 6, ACK 7, and CRC 4 Errors. This holds true up to eight microsecond interruption durations. As the interruption duration increases, form 8 and stuff 9 errors become a good indicator. However, the controllers that can communicate with each other will also have an elevated stuff error rate. Therefore, stuff errors become difficult to use if the controller that is suffering from communications errors is to be isolated.

FIG. 14 shows the CAN Monitoring program's health index calculations. This calculation is based on user defined weights, the percentage of errors, and the number of messages lost during a measurement period. The program produces useable indicators of CAN bus health. In various embodiments, if the program has a difficult time detecting sub-bit errors, this may be a limitation of the CAN controllers themselves. When errors are greater than a CAN frame's bit, the health index starts to increase. With interruption durations in the 2-8 µs range, this is indicative that a potential problem is forming. A user of a vehicle or other device having a controller area network bus could then be informed of such potential problem. After interruption durations of 10 µs and higher, problems start to be encountered that would cause loss of function on a vehicle. When a lost message is detected, the health index increases rapidly. Missing messages will most likely cause a loss of vehicle function.

CAN Tx Versus Rx Messages

It is unclear from the BOSCH spec if a CAN message that caused an error is retransmitted. The specification does state that any CAN frames will be either fully accepted by all controllers on the bus or an error frame will be transmitted to inform all controllers to ignore the previous message. But if a controller is in the error passive mode, it will be unable to assert the error frame on the bus. Another issue that will contribute to the mismatch in counts is the fact that the Tx Successful and Rx Successful flags must be cleared by software, but the error bits will be set whenever a CAN error occurs. It takes a finite time to service the CAN interrupt routine and therefore a message may have been transmitted or received successfully, but the next message to be received could be corrupt. This could happen prior to servicing the interrupt routine. So when the software reads the error register and the Tx Successful and Rx Successful flag, it may see all three bits set. Therefore, it may log a CAN message was successfully transmitted, received, and also generated an error. This is indicative of a hardware limitation.

The description above described the method for inducing corruption on the CAN bus and how the results were measured and obtained. The results were documented and discussed. The analysis of the distribution of errors on the CAN bus during the measurement interval was also described. The total counts of messages transmitted versus received were also described.

CAN Condition Monitor

The following describes the details and architecture of the CAN Condition Monitor (CCMON) program. This central controller can either be fixed within the communications network, or it can be removable, i.e., temporarily included within the network when needed to perform any of its functions. The methods for obtaining, storing, analyzing, and presenting the results to the end user are also described.

Overview

The CCMON is the master diagnostic module in this setup. It is responsible for i) starting and stopping a measurement interval, ii) reading the data from the individual controllers, iii) performing the analysis of this data, and iv) generating web pages from the results of the analysis. These web pages can be viewed with any web browser. A web server presents the web-pages to the end user via the standard HTTP protocol over an Ethernet connection. The data will also be stored in a log file that can be analyzed offline. In an embedded application, these web pages would be served up by a high end embedded controller or could generate custom Graphical User Interface (GUI) objects on a high end graphic display such as John Deere's Green Star 2 (GS2) or the Virtual Terminal Implement (VTi).

Figure 15:
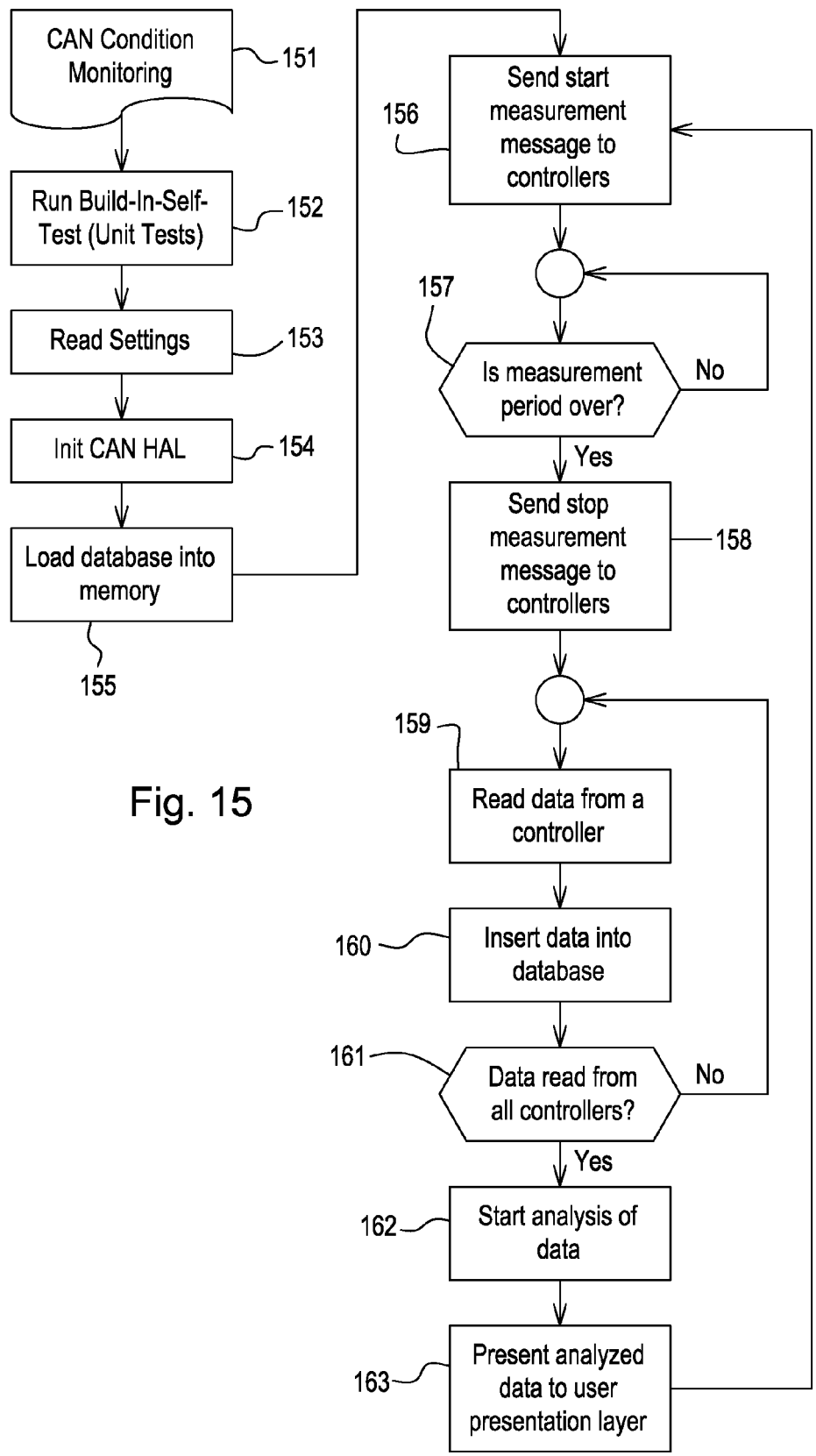
FIG. 15 is high level flow logic of the program code for the controller area network condition monitor program (CCMON).

FIG. 15 shows the high level flow of the CCMON program. When the program is invoked 151, it runs a build-in-self-test (BIST) 152. This is a series of automated tests that are run on several of the classes. These tests are run to verify the classes are functionally correct. If a test fails, the program will abort and exit.

Next, the settings are read 153 from an Extensible Markup Language (XML) file and parsed into a class that represents all of the settings used throughout the program. The CAN Hardware Abstraction Layer (HAL) is initialized 154. Finally, the database is loaded from the file system into Random Access Memory (RAM) 155.

At this point the CCMON is ready to perform the measurements and analysis operations. The CCMON sends out a synchronization signal to all controllers on the CAN bus 156. This message is used to synchronize the error counts and histograms across all controllers on the CAN bus.

After the measurement period is complete 157, the CCMON sends a stop measurement message to all controllers on the CAN bus 158. This stops the error count and histogram data collection on the controllers. The CCMON then reads all of the data collected on the controllers 159 and stores it in the database 160.

When the data is read from all of the controllers 161, the CCMON performs the data analysis on the collected data 162 and presents this information to the user presentation layer 163.

Other embodiments of the CCMON program have a more robust start and stop synchronization system that includes a request to start or stop a measurement followed by an acknowledgement of that message. When a stop message is received the controllers move the data being collected into a holding area in memory. It is this holding area that the CCMON program reads back. If a controller did not acknowledge the stop sync message, the CCMON would resend the stop sync message. All controllers save away the collected data to a temporary storage area. This guarantees the collected data is accurate and uncorrupted.

High Level Software Architecture

Figure 16:
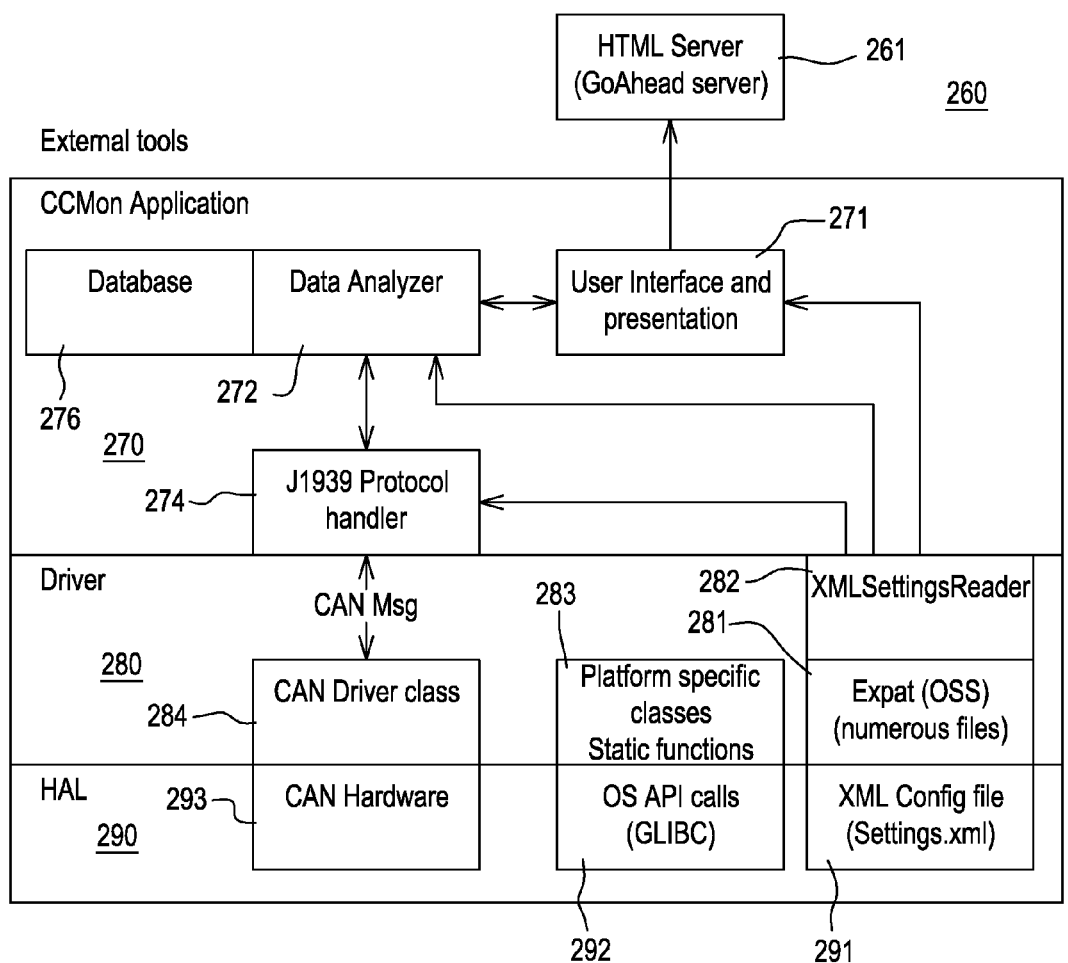
FIG. 16 is a high level block diagram of the software architecture of the CCMON.

The CCMON is written in an object orientated fashion using C++. FIG. 16 shows the high level organization and software architecture 260. The CCMON consists of several modules within a hardware abstraction layer 290, driver layer 280 and application layer 270. The blocks in FIG. 16 represent classes or collection of classes. The lines represent the high level data flow and interfaces between the classes.

The entire program is configured via an XML file 291 that is stored in the file system of the target. A utility called Expat 281 is used to parse the XML data into a settings run time class. This class contains all of the data that was stored in the XML file. Other classes query the settings class to find the current settings 282.

All operating system and platform specific implementations are encapsulated in the platform class 283. This encapsulates things such as thread sleep/suspend functions, Central Processing Unit (CPU) timing information, time duration, etc.

A module 284 exists to abstract the CAN hardware layer 293. This is done to allow the CAN Hardware layer to be of any type. Currently a hardware abstraction class exists for the Software CANCard using Windows based drivers and the MIG platform. The J1939 classes 274 implements the J1939 communications protocol over the CAN bus. This will be discussed in more detail in a later section.

The Measurement Services class will send a CAN message to initiate a measurement period. After some time period another CAN message is sent to stop the measurement service. This module also initiates a memory access read request to all of the controllers on the CAN bus. Once a measurement period has been completed and the data has been read from the controllers the data will be passed to the Data Analyzer module 272.

The Data Analyzer module 272 does the actual analysis on the data. It sends the data to other modules to generate graphs of the data. It also looks for trends in the data and generates a summary of the CAN bus health. This is sent to the HTML Generator.

The HTML Generator 271 takes the information from the Data Analyzer module and generates HTML code. This module also uses standard I/O file services to write the data to a file system 276. Therefore this software must be used with an operating system that provides some basic functionality.

The Tx/Rx Graph and the Error Graph module use two classes that encapsulate and hide the gd library. These two classes are used for drawing line and bar graphs.

Finally a light weight, simple HTTP server 261 serves the web pages generated by CCMON.

J1939 Architecture

Figure 17:
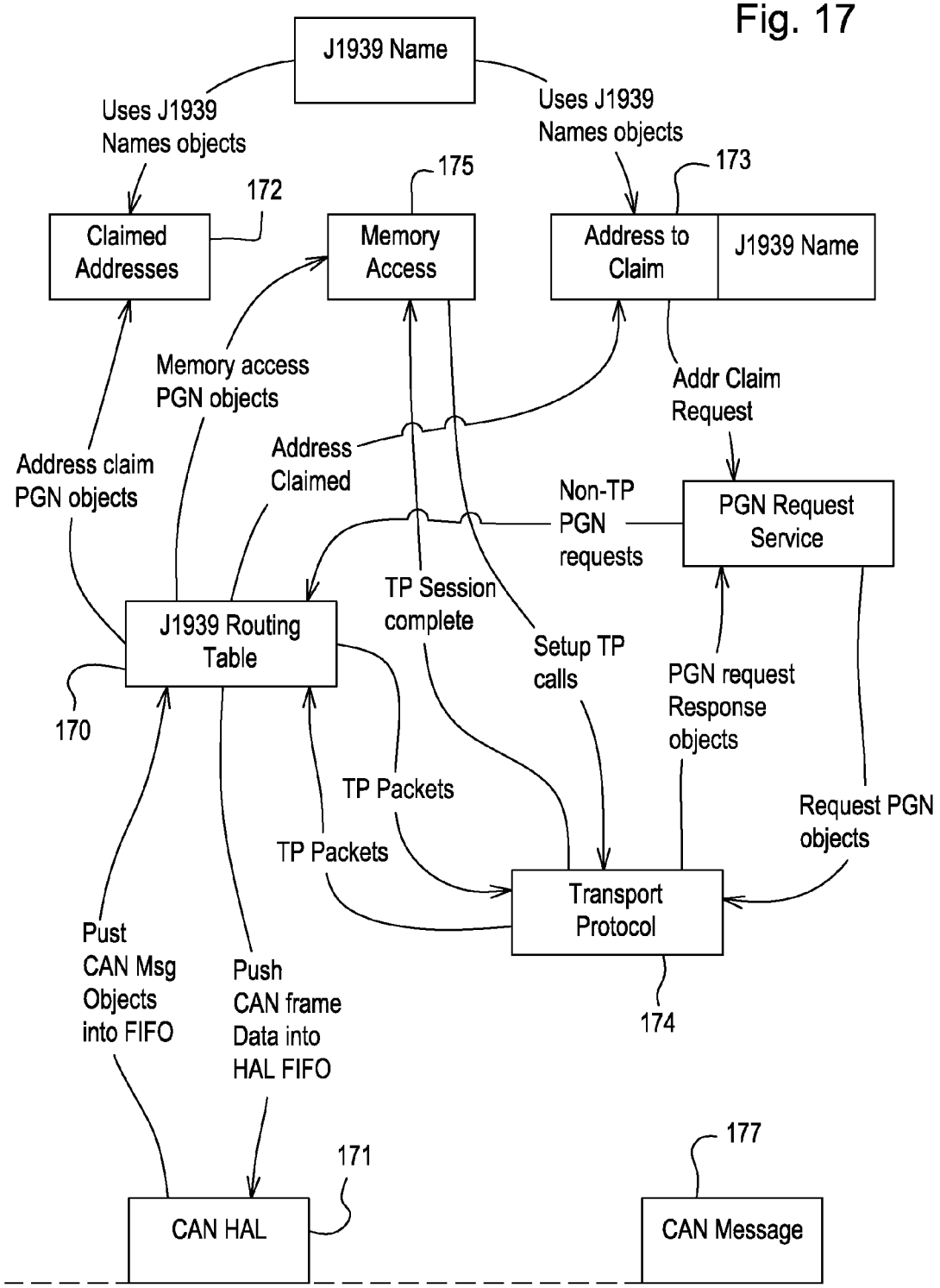
FIG. 17 illustrates a basic implementation of the J1939 System Architecture in an embodiment.

The J1939 module is shown in FIG. 17. The J1939 protocol is a rather complex protocol. For a controller to exist on a CAN bus there are some elements that should be implemented. The implementation shown in FIG. 17 is a basic implementation that can be used for this particular application. It is not intended to be a full implementation of the J1939 protocol.

At the lowest level, the CAN driver 171 that communicates with the hardware will receive CAN frames and push them into the J1939 system. A callback function must be registered with the J1939 system to allow it to send CAN frames to transmit to the hardware interface.

At, the center of the entire module is the J1939 routing table 170. All messages go through the J1939 routing table. All J1939 sub-systems are derived from the CRoutingService class. This class has three static member variables that store a list of J1939 sub-systems. There is a list of PGNs that each sub-system wants to process, and a list of PGNs that the subsystem will respond to if a PGN request is received. When a J1939 sub-system is derived from the CRoutingService, it's constructor automatically registers this information.

The Claimed Address module 172 stores any address claim message that is received. This module also provides an Application Programming Interface (API) for other modules to determine who is on the CAN bus.

The Address to Claim module 173 provides an API to send an address claim message with the desired address of this unit. It also provides the capability to send a PGN request for address claim message. This system also allows a module to claim multiple addresses if necessary. To claim multiple addresses, additional Address To Claim modules would be instantiated.

The transport protocol module 174 handles all of the J1939 transport protocol messages. When a J1939 sub-system needs to handle or transmit data via a transport session, it creates a new instance of a Transport Protocol (TP) manager. The TP Manager then allocates the memory for the TP session on the heap. When TP messages are detected, the TP Manager handles all of the transactions. Once a TP session is finished, it notifies the owner that the session has been completed. At this point, the owner can read the data stored in the TP Manager or destroy the object and recover the memory.

The Memory Access module 175 handles the J1939 memory access protocol. Typically this needs to go through the Transport Protocol module to read or write data from or to controllers on the CAN bus. Only memory access reads are supported in a preferred embodiment, although other access types could be supported in other embodiments. When a read operation is requested, the Memory Access (MA) module will determine if it needs to perform a standard MA Read or a TP Read. If a TP read is required, it creates a new instance of a TP Manager. The TP Manager then handles the TP session. The MA module handles the Diagnostic Messaging (DM)14/15 messages. This module also notifies the owner when a MA read is complete.

There are numerous classes that were created to abstract a CAN frame. In the J1939 protocol, a CAN Frame can be interpreted differently depending on its PGN. Based on the PGN of a J1939 message, the data and Protocol Data Unit (PDU) Specific (PS)/Group Extension (GE) are interpreted differently. Therefore, classes were written to provide an interface to reinterpret the data and Identifiers (ID's) of a CAN frame. Classes were written to interpret a CAN frame as a DM14, DM15, J1939 Name, PGN Request, and Transport Protocol Connection Manager. This facilitated the coding and handling of various types of CAN frames.

The CAN Message class 177 encapsulates a CAN Data frame. It provides an API to get and set the data in a CAN Frame. It also provides extended functionality to support the J1939 constructs that exist on top of a CAN Frame.

Data Analyzer Architecture

Figure 18:
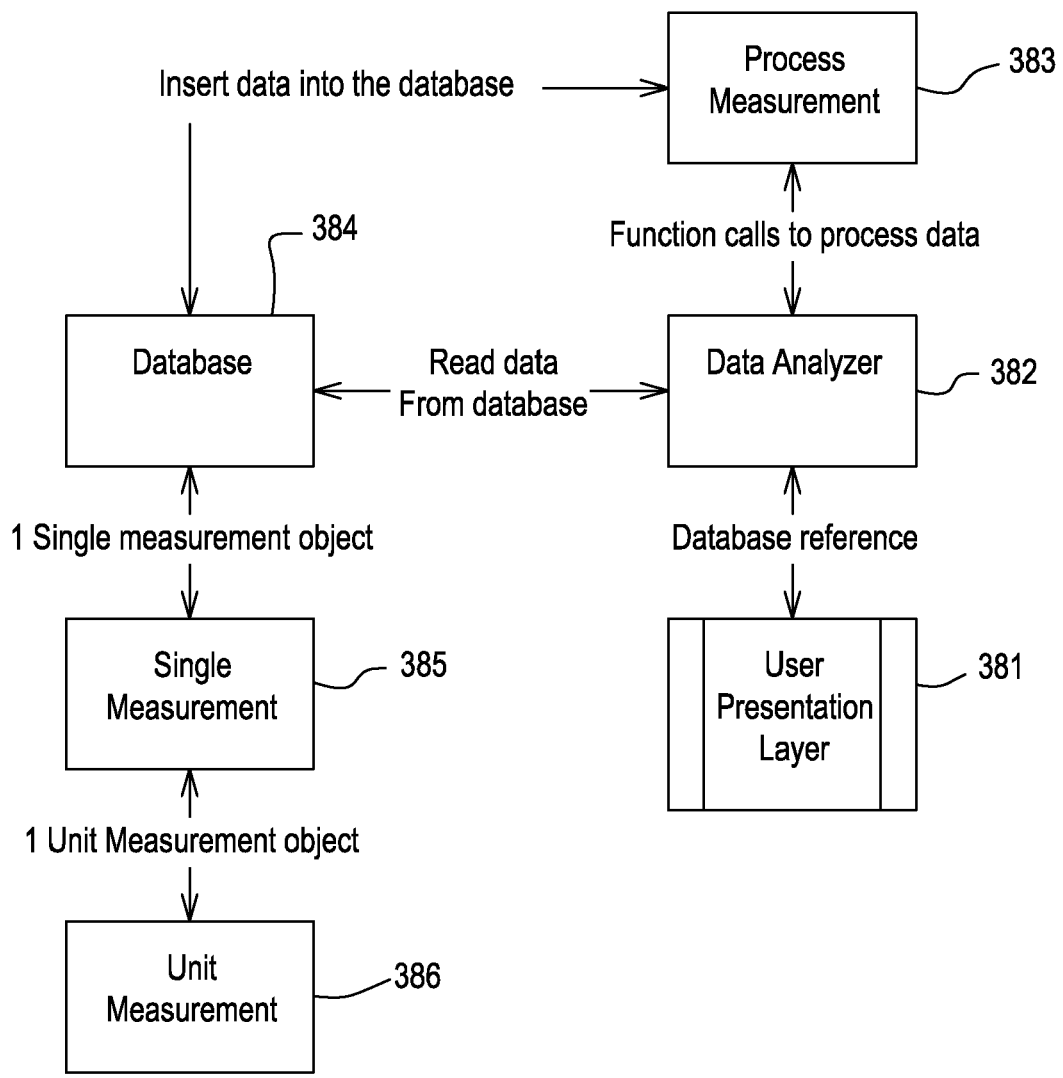
FIG. 18 illustrates the architecture of the Data Analyzer.

FIG. 18 illustrates the Data Analyzer architecture. The User Presentation Layer 381 receives data from the Database 384 and the Data Analyzer 382 and generates HTML web pages based on the information.

The functions of the Data Analyzer 382 are based on a measurement period. A measurement period is a user defined time window when the measurement of CAN messages and error counts is performed.

The Process measurement class 383 initiates and stops a measurement period. It also handles the creation of the memory access objects and the receiving of data from the controllers. Once the data has been received, it formats the data into unit measurement objects. A unit measurement object encapsulates all of the data necessary to represent the error count and CAN message histogram information during a measurement period.

The unit measurement objects 386 are further inserted into a single measurement block 385. A Single measurement object consists of a start time, a stop time, the number of controllers, followed by all of the single measurement objects. Several single measurement objects 385 make up the database 384. The database is periodically written to the file system to be stored across CCMON invocations and power cycles of the MIG.

FIG. 19 shows the internal structure of the database 390. It is made up of all the measurements 391 for a duration, e.g., 24 hours. Each measurement comprises data from all of the controllers 392. For a given controller 393, the database will contain LEC errors 394 and the CAN error structure 395. The database file 200 is shown in FIG. 20. The database file 200 contains data 393 that repeats for as many controllers that are detected on the bus. The Can error structure 395 comprises an eight bit bus off count 201, an 8 bit error warning error count 202, a thirty-two bit RX error count 203, a thirty-two bit Tx error count 204, a thirty-two bit id 205. The controller data 393 also contains valid CAN errors 206, LEC error arrays 207, valid LEC 208 and the address of the unit 209. In addition, the database file 200 contains the number of units detected on the Can bus 210, the stop measurement time 211, and the start measurement time 212.

When CCMON is invoked it reads the database file 200 and parses the data into the run time database. The run time database only stores the last 24 hours of data. The database is purged of data older than 24 hours when new data is added.

CAN Health Summary

The end result of the analysis is an executive summary. The CCMON generates several web pages that list the status and results of the analysis. FIG. 21 shows an illustrative example of the HTML output 219.

The general idea behind the summary is a stop light approach. If the "CAN Bus Health" 218 is green then everything is working correctly. The color yellow 215 indicates an elevated error occurrence on the CAN bus, but the vehicle is still operating normally. A red status 214 indicates the CAN bus is potentially affecting operation of the vehicle. Other status indicators may also be used. A user can also click on the links 213 to see graphs of CAN errors, Tx/Rx counts, CAN bus loading, and graphs of the CAN bus loading.

Analysis Method

Figure 10:
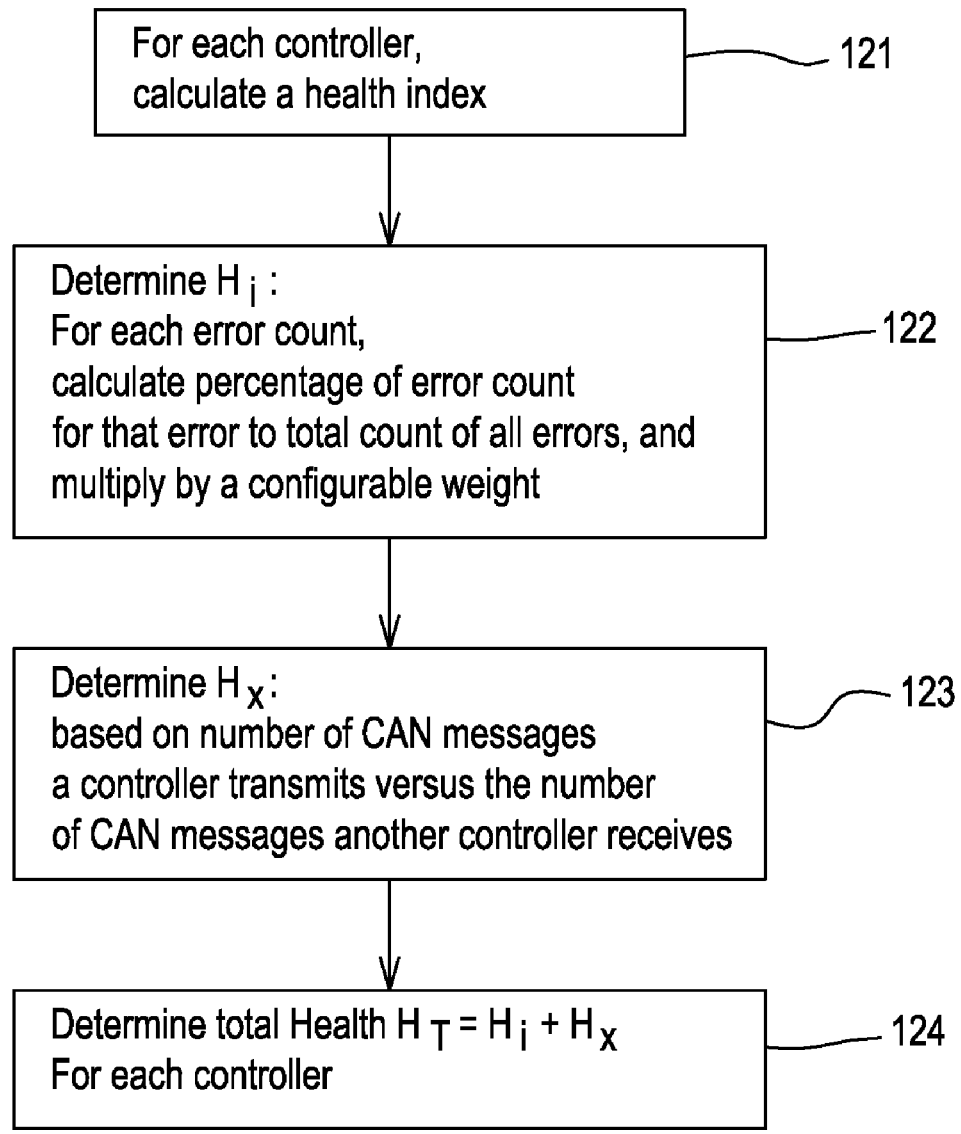
FIG. 10 shows a process flow diagram for analyzing error data on a controller area network bus.

Once the measurement results have been stored in the database, the CCMON performs an analysis on the data, as shown in FIG. 10. Each controller gets assigned a health index, 121. The health index is composed of two separate calculations. The first part of the health index is based on the total error count for each controller and the individual error counts multiplied by a configurable weight, 122. The second part of the health index is based on the number of CAN messages a controller transmits versus the number of CAN messages another controller receives, 123. This information is used as a type of histogram to relate the number of times a controller transmitted a CAN message that another controller failed to receive.

The first part of the health index is calculated with the following equation:

$$Hi = \sum_{i=0}^{7} W_i * \frac{E_i}{E_T}$$

$H_i$ is the health index; $W_i$ is the weight of the index i; $E_i$ is the error count for the error i as obtained from each individual controller; and $E_T$ is the total error count for all errors on the controller. These are summed for all eight errors: no error, stuff error, form error, ack error, bit 1 error, bit 0 error, and CRC error.

The weights for all of the experiment results are listed below for a preferred embodiment, and in parenthesis ( ) for a later preferred embodiment. Other embodiments may have different weights and/or different types of errors.

For "no error," the weight is zero. However, "good" messages are not taken into consideration.

For "stuff" errors, the weight is 20 (4.8). Stuff errors occur more frequently on controllers that do not have the CAN corruption. The weight was chosen to be higher than a bit 1 or bit 0 error, but much lower than CRC errors.

For "form" errors, the weight is 20 (4.4). Form errors seem to occur with the same frequency on all controllers on the bus. The weight was chosen to be higher than a bit 1 or bit 0 error, but much lower than CRC errors.

For "ack" errors, the weight is 200 (140). If a controller gets ACK errors, that means there is no other controller on the bus to acknowledge a CAN frame it is trying to transmit. Therefore, there is a high likelihood that this indicates a connector problem.

For "bit 1" error, the weight is 10 (6.7). This type of error is a good indicator that the controller is having some sort of CAN corruption. Other embodiments may change this weight.

For "bit 0" errors, the weight is 10 (38). However, these errors occur so infrequently that they can be deemed to be of low importance.

For CRC errors, the weight is 100 (5.8). CRC errors are an indication that a CAN frame was initially transmitted correctly, but was corrupted in route. This is typically an indication of sub-bit errors.

The second part of the health index is calculated based on the following equation:

$$H_{TXN} = \frac{T_{XN} - R_{XN}}{T_{XN}}$$

$$H_{RXN} = \frac{T_{NX} - R_{NX}}{T_{NX}}$$

$$H_X = \frac{\sum_{n=0}^{m} H_{TXN}}{m} + \frac{\sum_{n=0}^{m} H_{RXN}}{m}$$

$H_{TXN}$ is the transmit failure rate between controller X and controller N; $H_{RXN}$ is the transmit failure rate between controller N and controller X; $T_{XN}$ is the total number of messages transmitted by controller X; $R_{XN}$ is the total number of messages received by controller N from controller X; $T_{NX}$ is the total number of messages transmitted by controller N to controller X; $R_{NX}$ is the total number of messages received by controller X from controller N; m is the total number of controllers detected on the CAN bus. Finally $H_X$ is the overall health for controller X.

The total health, 124, of a controller is then:

$$H_T = H_I + H_X$$

The health index may be backwards from what one would expect. A higher health index indicates a decrease in the health of the controller. A health index of 0 or near 0 indicates a healthy controller.

The total health is then compared to a configurable health index threshold. The following pseudo code is used to decide if the health of a controller is in the Green, Yellow, or Red range:

If $H_T$<Yellow Threshold
Controller is at green health
Else if $H_T$<Red Threshold
Controller is at yellow health
Else
Controller is at red health The total health of the CAN bus is also governed by configurable values. The overall health uses a similar weighting scheme as the health index above. The overall health is determined by the equation below:

$$H_O = \sum_{i=0}^{m} C_i$$

Where $H_O$ is the overall health indicator and $C_i$ is the color value. Each color is assigned a number. Green health is 0, yellow health is 1, red health is 2, and black health is 3. The current overall health thresholds are as follows: less than 2 is a green CAN bus, less than 4 is a yellow CAN bus, anything equal to or greater than 4 is a red CAN bus. Therefore it takes 2 yellow controllers to make the overall health yellow, 4 yellow controllers to make a red bus, 2 red controllers to make a red bus, and so on.

The above description has described the details of the CCMON program including its architecture, how it obtains measurement results, and how it analyzes the results, stores the results, and displays the results to an end user. The configurability of the CCMON program is also discussed as well as the mathematics behind the health indicator.

Based on the above, a controller that is having communications problems can be detected and isolated. The part of the CAN network that is having intermittent communications can also be isolated. The CCMON program can isolate a problem to an individual controller having communications problems if it has an elevated, health indicator when compared to other controllers on the CAN bus. In other embodiments, the program may indicate which controller should be replaced or repaired; or for the case of a failing CAN harness, the program may indicate to the user where on the CAN bus the problem is occurring.

With this information, preventive maintenance can be maintained, thereby keeping the vehicle operating at maximum productivity. Based on trends in the data, a determination can be made as to whether or not a controller is going to fail. In a preferred embodiment, the weights for the various types of errors are configurable. Setting the desired configurable weights for the various errors is performed by an end-user. An end user may be the CCMON product manufacturer or program developer, maintenance or service providers, or vehicle owners. These weights can be further refined by running the program on actual vehicles over time and recording the results. The results can be post-processed and adjusted for optimal results on a particular vehicle.

Other embodiments may analyze the data into other ways to analyze the data. For example, embodiments may take all of the collected data for all vehicles that the CCMON is on. This data is then hand analyzed to determine what data is "good" data and what data shows CAN communications failures. A neural network is taught the good data from the bad data. The neural network can be integrated into the CCMON program to perform additional checks on the measured data. If several sources indicate the data is good, the neutral network could then use this data to update its training.

Other embodiments may take into account the effects of additional controllers on the bus and how the CAN corruptor is inserted on the CAN bus. In this embodiment, only three controllers were used and one controller was always separated from the other two via the CAN corrupter. Other embodiments may include any other number and configuration of controllers. For example, an embodiment may have four controllers on the bus with the CAN corruptor inserted between two of them. Therefore controllers 1 and 2 would be able to communicate without problems and controllers 3 and 4 would be able to communicate without problems. However, controllers 1 and 2 would have problems communicating with controllers 3 and 4. This configuration would represent a problem with the CAN harness itself and not a connector on a controller. The effects of this CAN topology may influence how the weights should be configured in the CCMON program.

In the preferred embodiment discussed herein, a high-end embedded controller was utilized, but other embodiments may have the CAN Condition Monitor ported to other, less capable controllers or displays. The data could also be collected, stored, and post-processed on a PC running a variant of this program, although this configuration would loose the real-time diagnostic capability of the current implementation.

There are several benefits of the CAN condition monitor program. First this program can be used as a valuable tool to analyze and predict potential CAN bus problems before they reduce the functionality of the vehicle. Variations in the preferred embodiment with modifications to the CCMON program can provide additional benefit. The CCMON program can be connected to a CAN database containing all of the information about CAN traffic on a vehicle. This includes what controller transmits a message, which controller receives the message, the periodic transmit rate (if it is a periodic message), the time-out of a message, the length of the message, and what data in the message is transmitted. The CCMON program can read this data into a run-time database, monitor all periodic CAN traffic, and verify it against the periodic rate from the CAN database. The CCMON can notify the user if the periodic messages start to deviate from the desired rate. This could be factored into each controller health indicator. Eventually this information could be fed back to the designers of the various controllers to help them tune the performance and therefore reduce jitter in the messages.

Another embodiment utilizes microcontrollers that provide the transmit and receive error counts in the CAN controllers. The Infineon (formerly Siemens) C16x family of microcontrollers do not allow the transmit and receive error counts in the CAN controller to be read by software. These counts are contained with the CAN controller built into the microcontrollers. Also the first ST10 microcontrollers had the same CAN controller as the C16x family. The new ST10F27x microcontrollers as well as the new Infineon XC16x parts provide the transmit and receive error counts as memory mapped registers. This information can be graphed over time and increases in transmit and receive counts can be correlated with external events. These external events could be vibrations in the field, high vehicle speeds, ambient temperature, driver abuse, or some other external event that could lead to increased CAN errors or increased stress on a controller.

Although the above description has described monitoring a controller area network where the controllers are communicatively coupled by being physically hard-wired, other embodiments could utilize wireless technologies between the controllers themselves and between the controllers and the data collector and/or analyzer.

Having described the preferred embodiment, it will become apparent that various modifications can be made without departing from the scope of the invention as defined in the accompanying claims.

The invention claimed is:

1. A method for monitoring a condition of a communications network having a plurality of controllers communicatively coupled over the network by a communication bus, the method comprising:
   maintaining a count of each type of error code and a histogram of all network messages seen by each of the controllers within a separate communication bus segment during a measurement period;
   using the count and the histogram in determining a bus health index of each segment of the communication bus based upon (i) a percentage of a given type of error and (ii) a total count of all errors during a measurement period, wherein the count is used to determine the percentage of the given type of error and the histogram is used to determine the total count of all errors; and
   detecting and isolating an individual controller of the plurality of controllers that is having a communications problem by determining that the individual controller having the communication problem has an elevated health index when compared to other controllers of the plurality of controllers, whereby an indication is given to a user that the individual controller or communication bus segment should be replaced or repaired.

2. The method of claim 1 wherein the bus health index is further based on pre-defined weights given to the percentage of each of the given type of errors to the total count of errors, and the number of messages lost during the measurement period.

3. The method of claim 1 further comprising determining a potential future failure of a component before the component fails by determining a change in the bus health index as a result of changes, over a time period of a plurality of measurement periods, in the percentages of at least one of the given type of errors to the total count of all errors determined during each of the plurality of measurement periods.

4. The method of claim 1 further comprising determining, by another controller of the plurality of controllers, that a given controller of the plurality of controllers will fail at some future point in time based on trends of the bus health index.

5. The method of claim 1 further comprising generating web pages with the status and results of the monitoring by displaying graphs of network errors, network bus loading, and error counts.

6. A system comprising:
   a communications network having a plurality of controllers communicatively coupled over the network by a communication bus, the system comprising:
   program code associated with each controller of the plurality of controllers for maintaining a count of each type of error code and a histogram of all network messages seen by each respective one of the plurality of controllers during a measurement period; and
   a central controller using the count and the histogram in determining a bus health index of each segment of the communication bus based upon (i) a percentage of a given type of error and (ii) a total count of all errors during a measurement period, wherein the count is used to determine the percentage of the given type of error and the histogram is used to determine the total count of all errors during a measurement period for all of the plurality of controllers.

7. The system of claim 6 wherein the counts from each controller are synchronized across all of the plurality of controllers through a start and stop message that defines the measurement period to all of the plurality of controllers.

8. A system for monitoring an in-vehicle communications network having a plurality of separate controllers for each one of a plurality of sensors and devices, the controllers communicatively coupled over the network, comprising:
   means for receiving data from each controller of a count of each type of error code and a histogram of all network messages seen by each of the controllers during a measurement period; and
   a central controller having means for determining a network health index for each controller comprising (i) a first part based upon a total error count for the controller and individual error counts multiplied by a user-defined configurable weight that is determined using the count and (ii) a second part based upon a number of messages a controller transmits versus the number of messages another controller receives that is determined using the histogram.

9. The system of claim 8 further comprising means for determining, based on trends in the data, if a given controller is going to fail by setting the desired weights for the various errors based on previously running the program code for determining and receiving data from the in-vehicle controllers over time and recording the results and adjusting the desired weights based on the results.

10. The system of claim 8 wherein the type of error codes comprise at least one of a stuff error that indicates six or more consecutive bits of the same state; a form error that indicates that a fixed format part of a controller are network frame was received with an incorrect state, and ACK error that indicates when no other controllers on the bus acknowledge the transmitted controller area network message; a bit 1 error that indicates when a transmitting unit wanted to transmit a recessive bit (a logic 1) but the monitoring value on the bus was a dominant (a logic 0) bit; a bit 0 error that indicates when a transmitting unit wanted to transmit a dominant bit (a logic 0) but the monitoring value on the bus was a recessive bit (a logic 1); a CRC error that indicates when the calculated CRC of the data that was received and the CRC within the frame do not match, typically caused by a corrupt bit in the frame; an error warning indicating that the controller area network controller has gone from the Error Active state to the Error Passive State; and bus off error that indicates that the controller area network controller has shut itself off from transmitting or receiving data.

* * * * *